United States Patent
Post et al.

(10) Patent No.: US 12,117,113 B2
(45) Date of Patent: Oct. 15, 2024

(54) CONNECTION BLOCKS AND PUMP MANIFOLD SYSTEMS, AND RELATED METHODS, FOR PUMPING OPERATIONS

(71) Applicant: FORUM US, INC., Houston, TX (US)

(72) Inventors: Steven Post, Weatherford, TX (US); Harry Alexander Hughes, II, Beeville, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 18/465,826

(22) Filed: Sep. 12, 2023

(65) Prior Publication Data

US 2024/0084944 A1 Mar. 14, 2024

Related U.S. Application Data

(60) Provisional application No. 63/525,942, filed on Jul. 10, 2023, provisional application No. 63/405,772, filed on Sep. 12, 2022.

(51) Int. Cl.
*F16L 41/03* (2006.01)
*E21B 19/02* (2006.01)
(Continued)

(52) U.S. Cl.
CPC .............. *F16L 41/03* (2013.01); *E21B 19/02* (2013.01); *F16L 1/0243* (2013.01); *F16L 3/015* (2013.01); *F16L 19/025* (2013.01); *F16L 19/06* (2013.01); *F16L 19/065* (2013.01); *F16L 21/065* (2013.01); *F16L 23/06* (2013.01); *F16L 23/08* (2013.01); *F16L 23/10* (2013.01); *F16L 29/007* (2013.01); *E21B 43/2607* (2020.05)

(58) Field of Classification Search
CPC ....... E21B 43/2607; F16L 23/06; F16L 23/08; F16L 23/10; F16L 19/025; F16L 19/06; F16L 19/065; F16L 21/065; F16L 41/03; F16L 1/0243
See application file for complete search history.

(56) References Cited

U.S. PATENT DOCUMENTS 4,443,029 A * 4/1984 Laxo ....................... F16L 23/08
285/93
8,899,268 B2 12/2014 Garner et al.
(Continued)

FOREIGN PATENT DOCUMENTS

RU 2629182 C9 11/2017

OTHER PUBLICATIONS

International Search Report and Written Opinion dated Nov. 2, 2023 for Application No. PCT/US2023/073974.

*Primary Examiner* — Atif H Chaudry
(74) *Attorney, Agent, or Firm* — Patterson + Sheridan, LLP

(57) ABSTRACT

Aspects of the present disclosure relate to connection blocks and pump manifold systems, and related methods, for pumping operations (such as frac operations). In one implementation, a connection block for disposition along a pump manifold of a pump system includes a first end hub having a first tube and a first outer shoulder extending outwardly relative to the first tube. The connection block includes a second end hub opposing the first end hub. The second end hub has a second tube and a second outer shoulder extending outwardly relative to the second tube. The connection block includes one or more faces between the first end hub and the second end hub.

32 Claims, 23 Drawing Sheets

(51) Int. Cl.

| | |
|---|---|
| *E21B 43/26* | (2006.01) |
| *F16L 1/024* | (2006.01) |
| *F16L 3/015* | (2006.01) |
| *F16L 19/025* | (2006.01) |
| *F16L 19/06* | (2006.01) |
| *F16L 19/065* | (2006.01) |
| *F16L 21/06* | (2006.01) |
| *F16L 23/06* | (2006.01) |
| *F16L 23/08* | (2006.01) |
| *F16L 23/10* | (2006.01) |
| *F16L 29/00* | (2006.01) |

(56) References Cited

U.S. PATENT DOCUMENTS

| | | | |
|---|---|---|---|
| 9,222,494 B2* | 12/2015 | Roach | F16B 2/06 |
| 9,239,125 B2 | 1/2016 | Ungchusri et al. | |
| 10,982,522 B1 | 4/2021 | Hill et al. | |
| 11,549,627 B2 | 1/2023 | Cook et al. | |
| 11,619,326 B1* | 4/2023 | Nguyen | F16F 1/3842 |
| | | | 166/308.1 |
| 2017/0122060 A1* | 5/2017 | Dille | E21B 33/068 |
| 2017/0370199 A1* | 12/2017 | Witkowski | F04B 23/06 |
| 2018/0284817 A1 | 10/2018 | Cook et al. | |
| 2020/0166026 A1 | 5/2020 | Marica | |
| 2020/0240557 A1* | 7/2020 | Guevel | F02K 1/80 |
| 2021/0215014 A1 | 7/2021 | Tran et al. | |
| 2022/0017355 A1 | 1/2022 | Post et al. | |
| 2023/0053422 A1 | 2/2023 | Cook et al. | |

* cited by examiner

CONNECTION BLOCKS AND PUMP MANIFOLD SYSTEMS, AND RELATED METHODS, FOR PUMPING OPERATIONS

CROSS-REFERENCE TO RELATED APPLICATIONS

This application claims the benefit of U.S. provisional patent application Ser. No. 63/525,942, filed Jul. 10, 2023, and claims the benefit of U.S. provisional patent application Ser. No. 63/405,772, filed Sep. 12, 2022, both of which are herein incorporated by reference in their entireties.

BACKGROUND

Field

Aspects of the present disclosure relate to connection blocks and pump manifold systems, and related methods, for pumping operations (such as frac operations).

Description of the Related Art

Pump manifolds (and the components thereof) can be expensive, complex, heavy, difficult to transport, difficult to install, and difficult to maintain. For example, it can take a lengthy amount of time (using multiple operations personnel) to connect pumps to a pump manifold. As another example, a pump manifold can involve an excess mount of equipment.

Therefore, there is a need for connection blocks, crane systems, pump manifold systems, and related methods, that facilitate inexpensive, simple, lightweight, and easy-to-use pumping operations.

SUMMARY

Aspects of the present disclosure relate to connection blocks and pump manifold systems, and related methods, for pumping operations (such as frac operations).

In one or more embodiments, a connection block for disposition along a pump manifold of a pump system includes a first end hub having a first tube and a first outer shoulder extending outwardly relative to the first tube. The connection block includes a second end hub opposing the first end hub. The second end hub has a second tube and a second outer shoulder extending outwardly relative to the second tube. The connection block includes one or more faces between the first end hub and the second end hub.

In one or more embodiments, a pump manifold system includes a plurality of connection blocks, each of the plurality of connection blocks includes a first end hub, a second end hub opposing the first end hub, one or more planar faces between the first end hub and the second end hub. The pump manifold system includes a plurality of conduits between the plurality of connection blocks. The pump manifold system includes a plurality of clamps coupling the plurality of conduits to the plurality of connection blocks.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
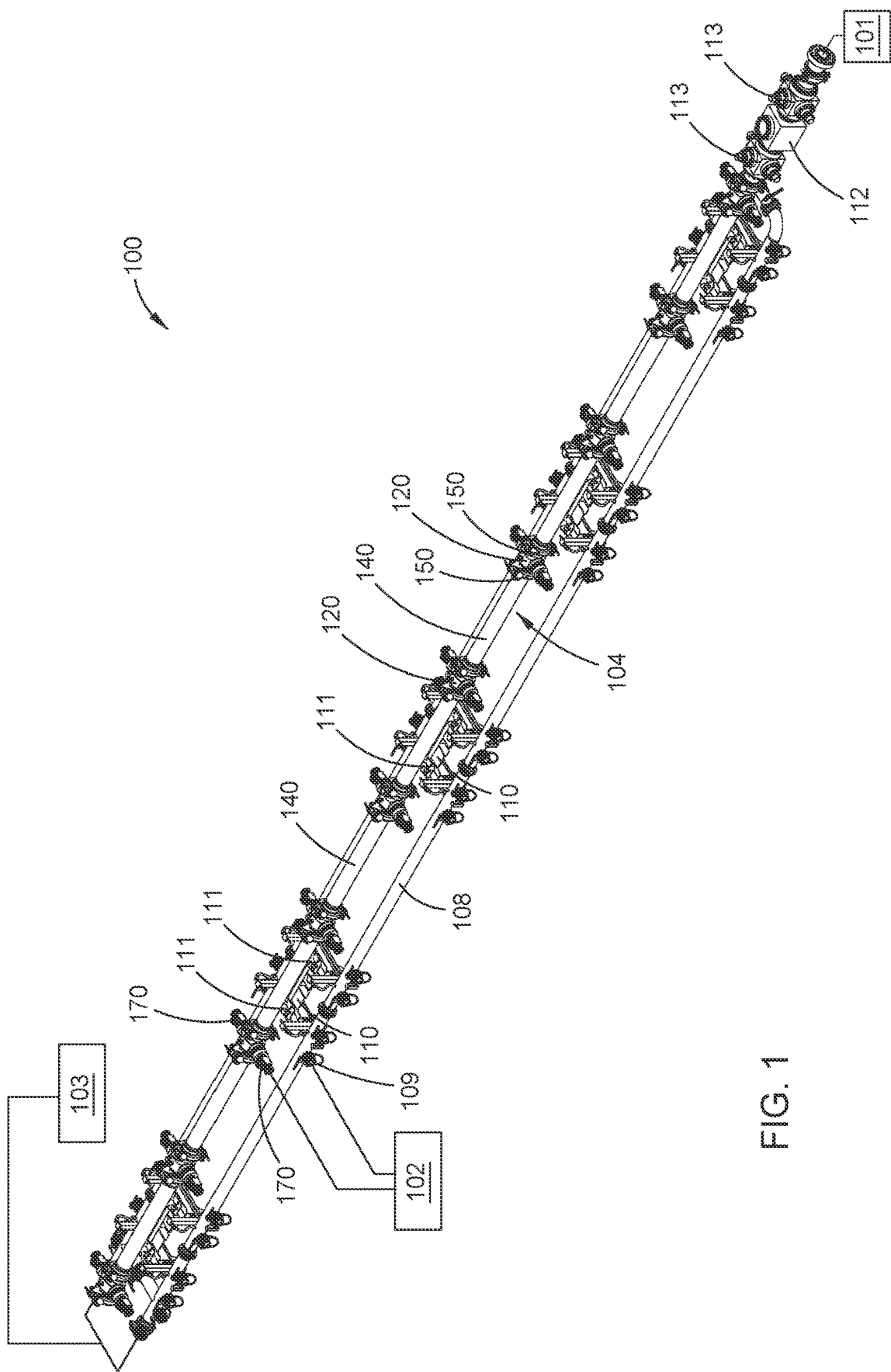
FIG. 1 is a schematic partial perspective view of a pump manifold system, according to one or more embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to connection blocks and pump manifold systems, and related methods, for pumping operations (such as frac operations). Aspects of the present disclosure also relate to crane systems and pump manifold systems, and related methods, for pumping operations (such as frac operations).

The disclosure contemplates that terms such as "couples," "coupling," "couple," and "coupled" may include but are not limited to welding, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

FIG. 1 is a schematic partial perspective view of a pump manifold system 100, according to one or more embodiments.

Figure 2:
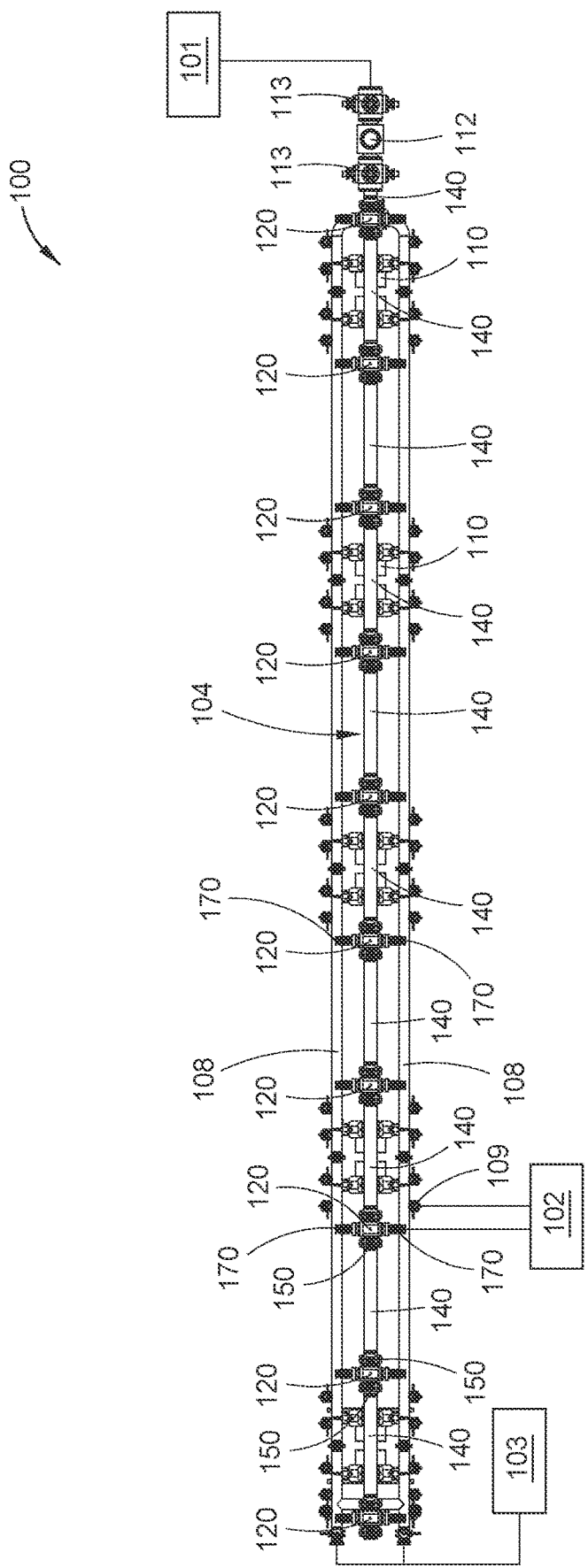
FIG. 2 is a schematic top view of the pump manifold system shown in FIG. 1.

FIG. 2 is a schematic top view of the pump manifold system 100 shown in FIG. 1.

In the implementation shown in FIGS. 1 and 2, the pump manifold system 100 is part of a pumping system connected to one or more wellhead structures 101 to pump fluid into the one or more wellhead structures 101. The fluid can be for example, a frac fluid.

A main line spool 104 (which can be referred to as a high pressure line) includes a plurality of connection blocks 120, a plurality of conduits 140 between the plurality of connection blocks 120, and a plurality of clamps 150 coupling the plurality of conduits 140 to the plurality of connection blocks 120. The main line spool 104 includes a plurality of pump valves 170 that are coupled to the connection blocks 120. The pump valves 170 are configured to connect to a plurality of pumps 102 (such as frac pumps). The main line spool 104 includes one or more bleed-off valves 113 and an isolation valve 112 disposed adjacent an end of the main line spool 104.

The present disclosure contemplates that the conduits 140 can be coupled to the connection blocks 120 by integrally forming the flanges of the conduits 140 with the flanges of the connection block 120. The flanges of the conduits 140 can be otherwise coupled to the flanges of the connection blocks 120 without fasteners (e.g., by using welding). In such embodiment(s), the clamps 150 can optionally be omitted.

The pump valves 170 are coupled to the connection blocks 120 using API flanges 196 coupled (e.g., fastened) to the connection blocks 120, and a plurality of quick-detach clamps 195 that clamp the API flanges 196 to the pump valves 170. The present disclosure contemplates that the pump valves 170 can be omitted.

A manifold inlet line 108 (which can be referred to as a low pressure line) is connected to one or more fluid sources 103 (such as tanks) to receive the fluid. The manifold inlet line 108 supplies the fluid to low pressure inlets of the pumps 102 through a plurality of outlet valves 109. The pump valves 170 receive the fluid from high pressure outlets of the pumps 102 such that the fluid (which was pressurized by the pumps 102) can be supplied to the one or more wellhead structures 101 such that the fluid is pumped downhole.

The pump manifold system 100 includes base frame supporting the plurality of connection blocks 120 and the plurality of conduits 140, and one or more rollers 111 (such as a plurality of rollers 111) mounted to the base frame. In one or more embodiments, the base frame includes one or more skids 110. In one or more embodiments, the base frame includes one or more stands and/or one or more trailers (such as one or more wheeled truck trailers). In one or more embodiments, each skid 110 includes at least one (such as two or more, for example, four) rollers 111. The plurality of connection blocks 120 and the plurality of conduits 140 are movable along the plurality of rollers 111 by the rotating movement of the rollers 111. The base frame (e.g., including the one or more skids 110 also support the manifold inlet line 108. The one or more skids 110 can be supported on and/or coupled together by a chassis (such as a chassis of a wheeled truck trailer).

In the implementation shown in FIGS. 1 and 2, the manifold inlet line 108 is aligned below the main line spool 104.

Figure 3:
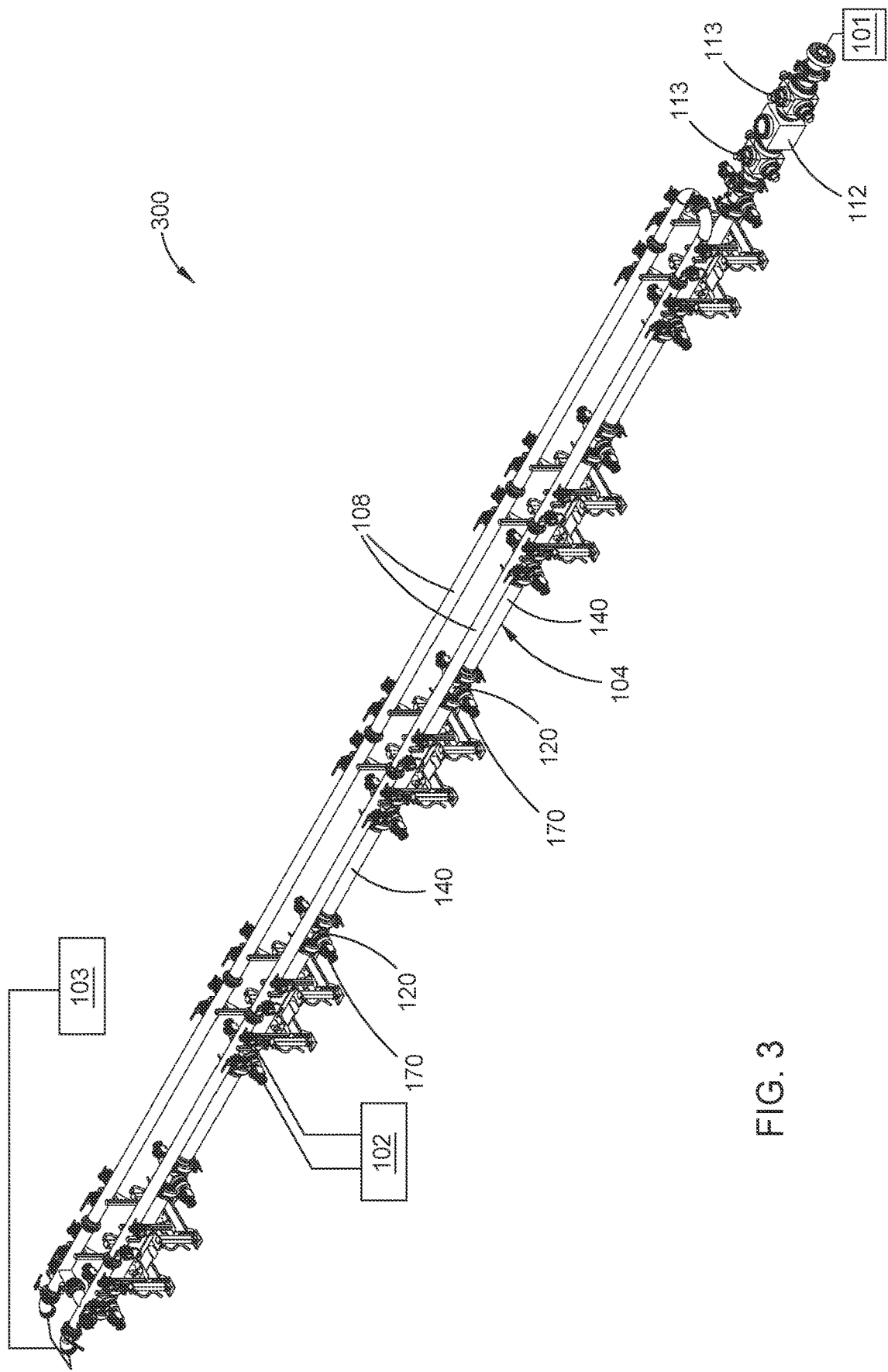
FIG. 3 is a schematic partial perspective view of a pump manifold system, according to one or more embodiments.

FIG. 3 is a schematic partial perspective view of a pump manifold system 300, according to one or more embodiments.

The pump manifold system 300 is similar to the pump manifold system 100 shown in FIGS. 1 and 2, and includes one or more aspects, features, components, operations, and/or properties thereof. In the implementation shown in FIG. 3, the manifold inlet line 108 is aligned above the main line spool 104.

Figure 4:
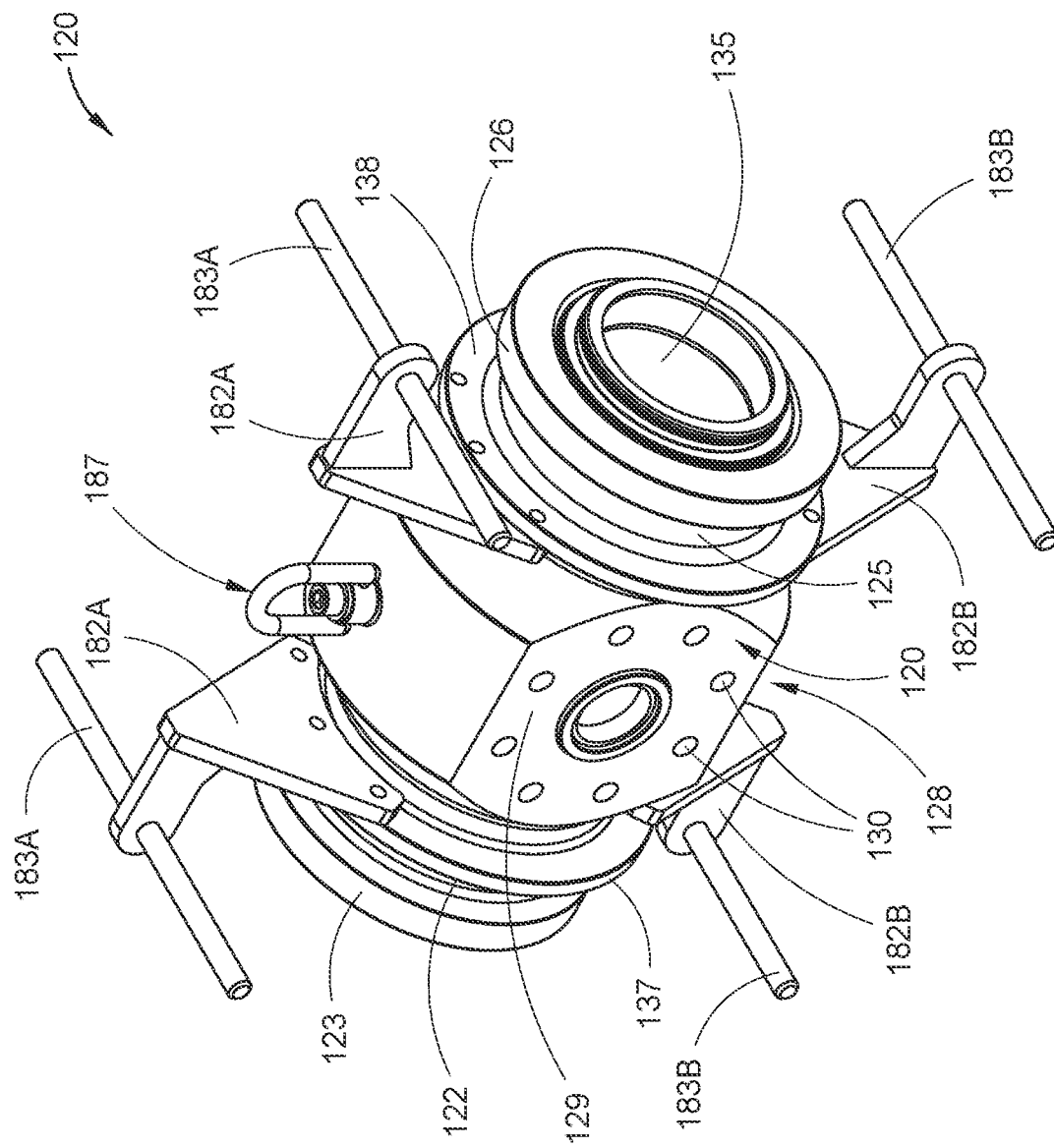
FIG. 4 is a schematic perspective view of one of the connection blocks shown in FIGS. 1-3, according to one or more embodiments.

FIG. 4 is a schematic perspective view of one of the connection blocks 120 shown in FIGS. 1-3, according to one or more embodiments.

Figure 5:
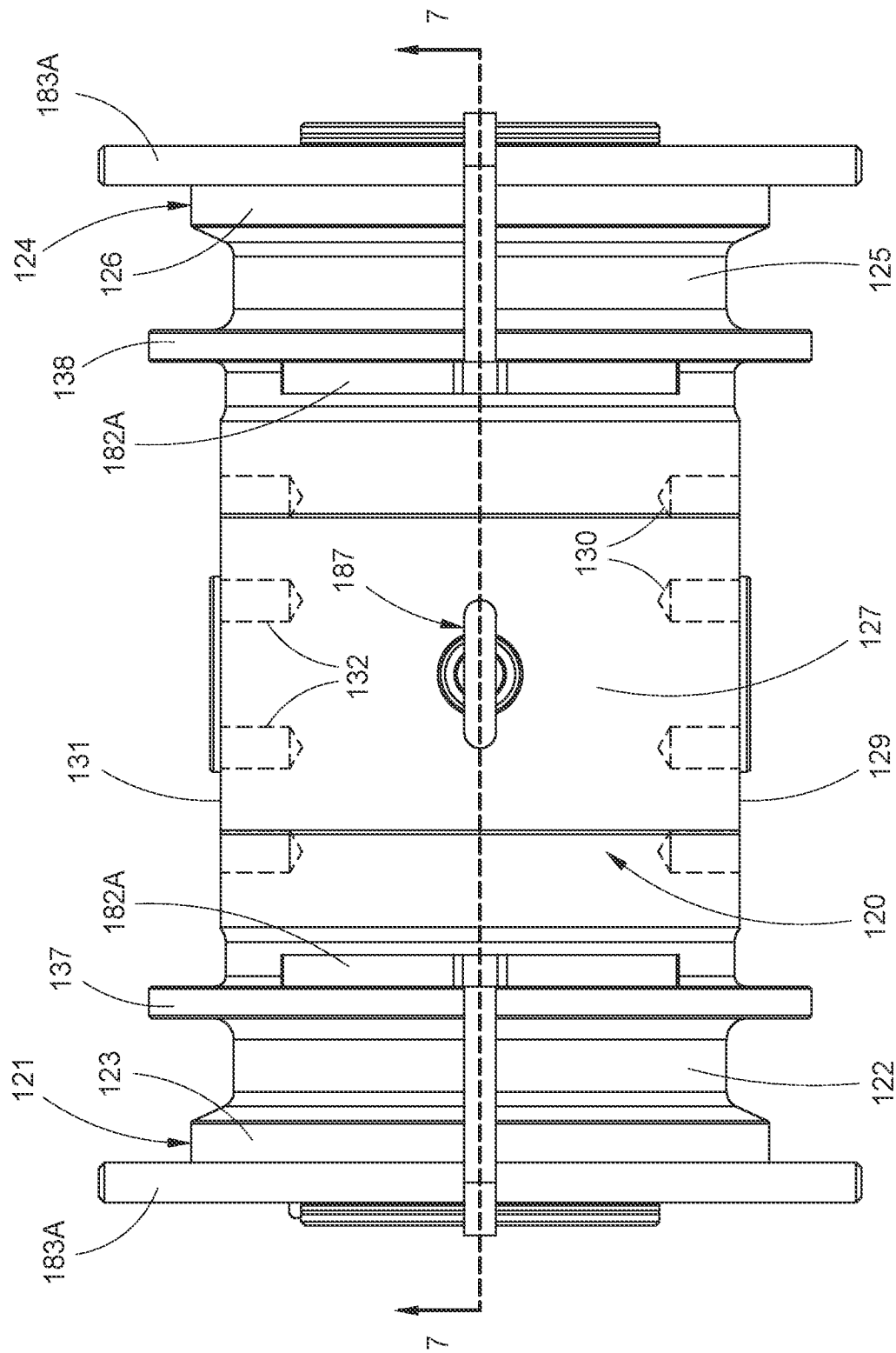
FIG. 5 is a schematic top view of the connection block shown in FIG. 4.

FIG. 5 is a schematic top view of the connection block 120 shown in FIG. 4.

Figure 6:
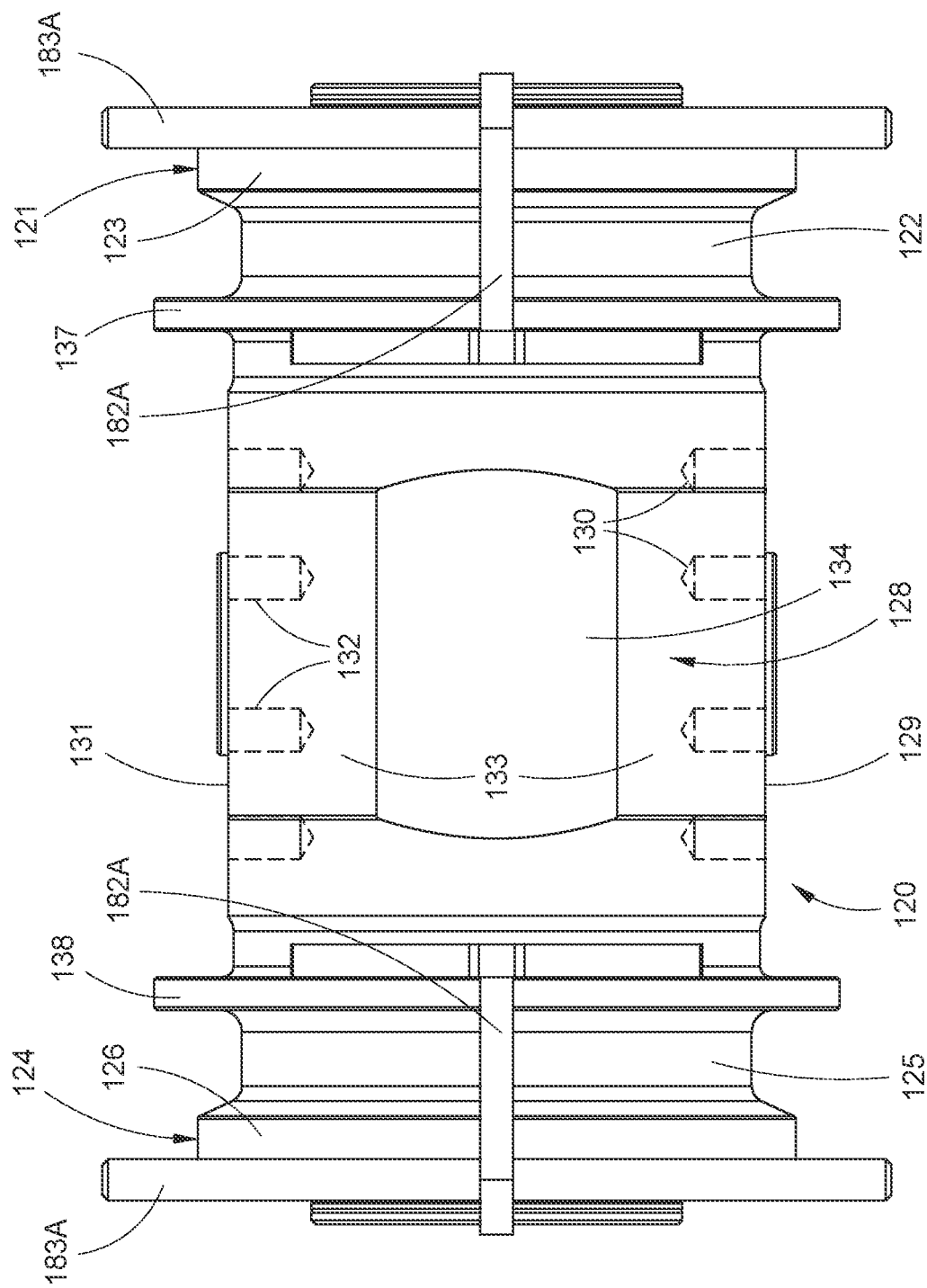
FIG. 6 is a schematic bottom view of the connection block shown in FIG. 4.

FIG. 6 is a schematic bottom view of the connection block 120 shown in FIG. 4.

Figure 7:
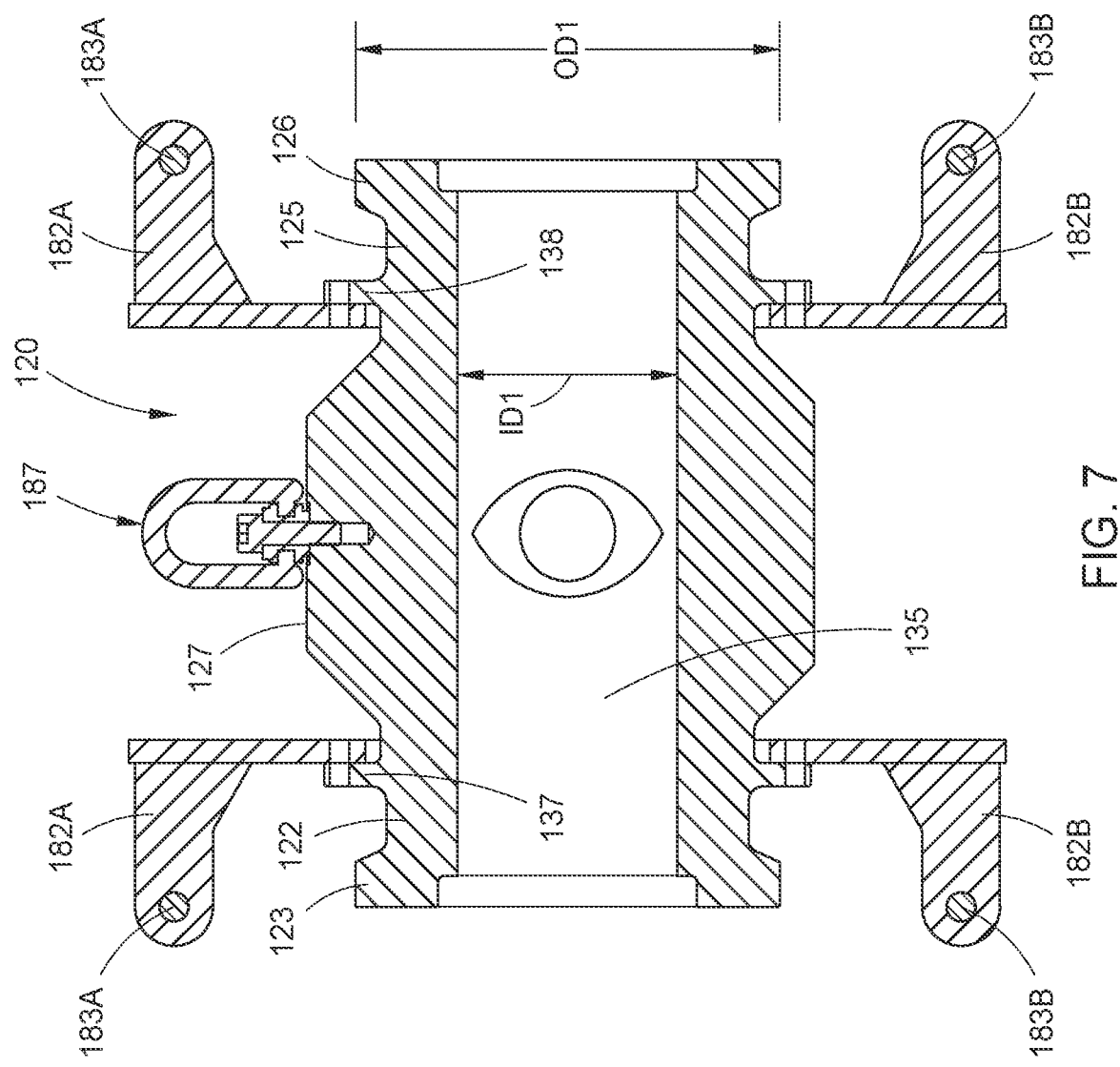
FIG. 7 is a schematic side cross-sectional view, along Section 6-6, of the connection block shown in FIGS. 4 and 5.

FIG. 7 is a schematic side cross-sectional view, along Section 6-6, of the connection block 120 shown in FIGS. 4 and 5.

The connection block 120 shown in FIGS. 4-7 can be used as each one of the connection blocks 120 shown in FIGS. 1-3.

The connection block 120 includes a first end hub 121 having a first tube 122 and a first outer shoulder 123 extending outwardly relative to the first tube 122. The connection block 120 includes a second end hub 124 opposing the first end hub 121. The second end hub 124 has a second tube 125 and a second outer shoulder 126 extending outwardly relative to the second tube 125. The connection block 120 includes one or more faces 127, 128 between the first end hub 121 and the second end hub 124. The connection block 120 includes one or more planar faces 129, 131 between the first end hub 121 and the second end hub 124. The one or more planar faces 129, 131 include a first planar face 129 and a second planar face 131. The connection block 120 includes one or more first fastener openings 130 formed in the first planar face 129. The connection block 120 includes a second planar face 131 between the first end hub 121 and the second end hub 124, and one or more second fastener openings 132 formed in the second planar face 131.

Figure 22:
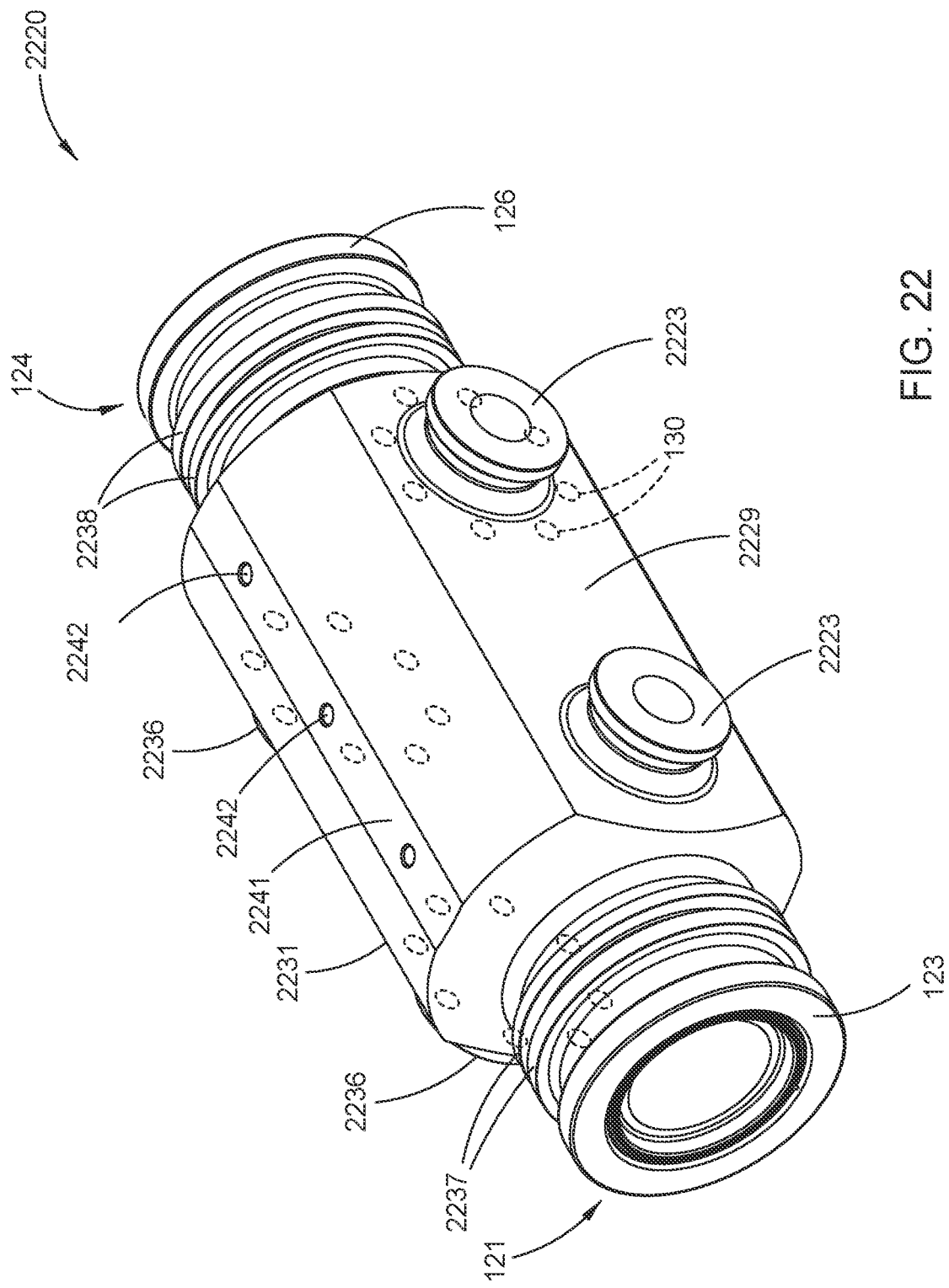
FIG. 22 is a schematic perspective view of a connection block, according to one or more embodiments.
Figure 23:
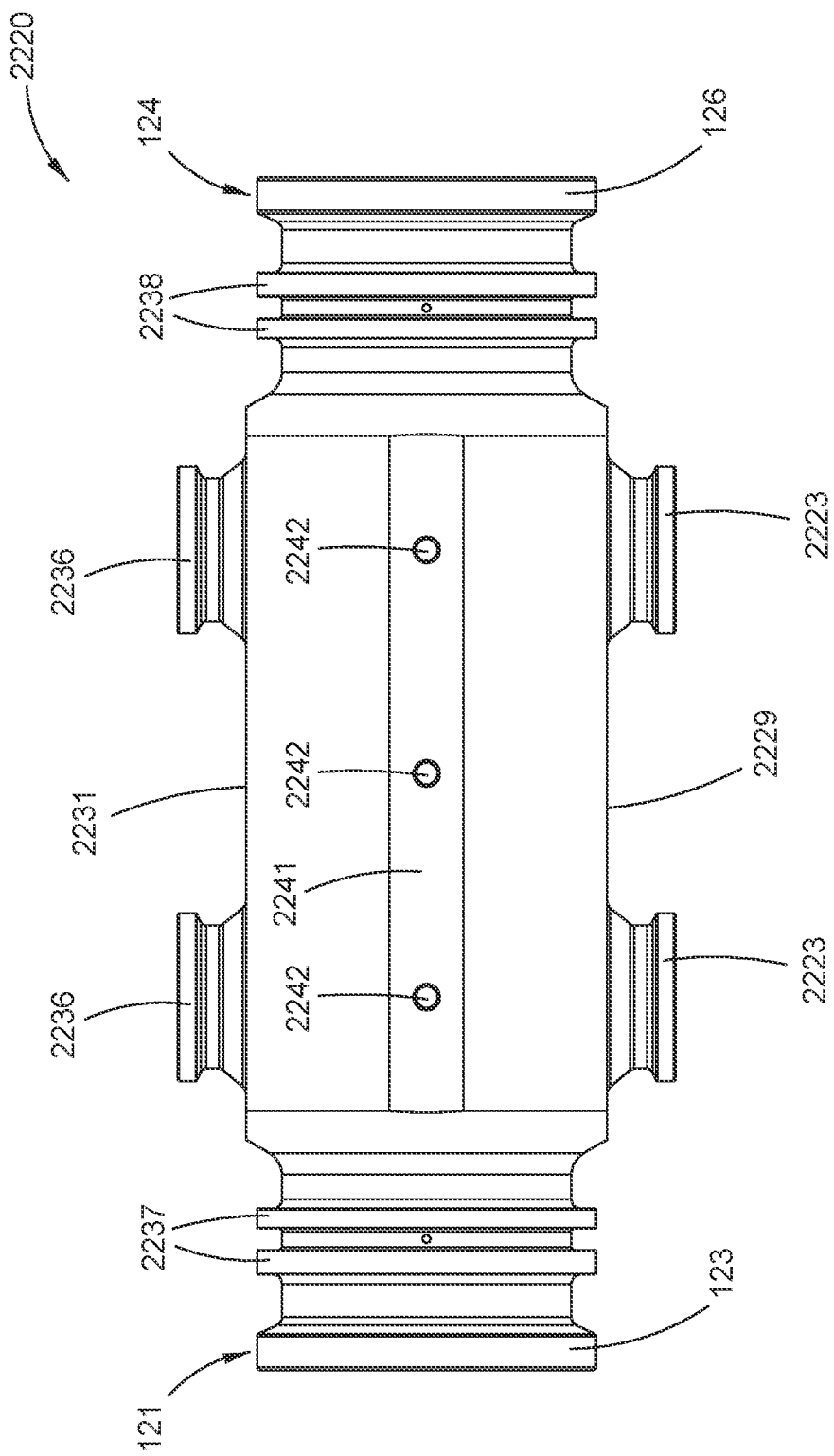
FIG. 23 is a schematic top view of the connection block shown in FIG. 22, according to one or more embodiments.

The present disclosure contemplates that the first planar face 129 and/or the second planar face 131 can be replaced with a respective end hub that includes an outer shoulder extending outwardly. The present disclosure also contemplates that the first planar face 129 and/or the second planar face 131 can include one or more hubs that extend therefrom. In such an embodiment, the connection block 120 is a three-hub, a four-hub connection block, or a six-hub connection block (as shown in FIGS. 22 and 23).

The present disclosure contemplates that the API flanges 196 can be coupled to the connection block 120 by integrally forming the API flanges 196 with the connection block 120. The API flanges 196 can be otherwise coupled to the connection block 120 without fasteners (e.g., by using welding). In such embodiment(s), the first and second fastener openings 130, 132 can optionally be omitted from the connection block 120.

In the implementation shown, the one or more faces 127, 128 are each arcuate. The present disclosure contemplates that the one or more faces 127, 128 can be planar such that the faces 127, 128 and the faces 129, 131 can define a rectangular profile. The connection block 120 includes a first arcuate face 127 between the first planar face 129 and the second planar face 131, and a second arcuate face 128 between the first planar face 129 and the second planar face 131, the second arcuate face 128 opposing the first arcuate face 127. The second arcuate face 128 includes two arcuate portions 133 and a planar portion 134 between the two arcuate portions 133. A lifting link 187 is coupled (e.g., threaded into) the first arcuate face 127. The lifting link 187 can be used to manipulate (such as lift and/or move) the connection block 120.

Each of the first outer shoulder 123 and the second outer shoulder 124 has an outer diameter OD1. The connection block 120 includes a central opening 135 extending through the connection block 120 and between the first end hub 121 and the second end hub 124. The central opening 135 has an inner diameter ID1. In one or more embodiments, the outer diameter OD1 is a ratio of the inner diameter ID1, and the ratio is 3:1 or less. In one or more embodiments, the ratio is 2:1 or less. In one or more embodiments, the outer diameter OD1 is less than 17.0 inches, and the inner diameter ID1 is greater than 4.5 inches, such as 6.0 inches or greater. In one or more embodiments, the outer diameter OD1 is 15.0 inches or less, such as 14.0 inches or less, and the inner diameter ID1 is 7.0 inches or more.

Figure 8:
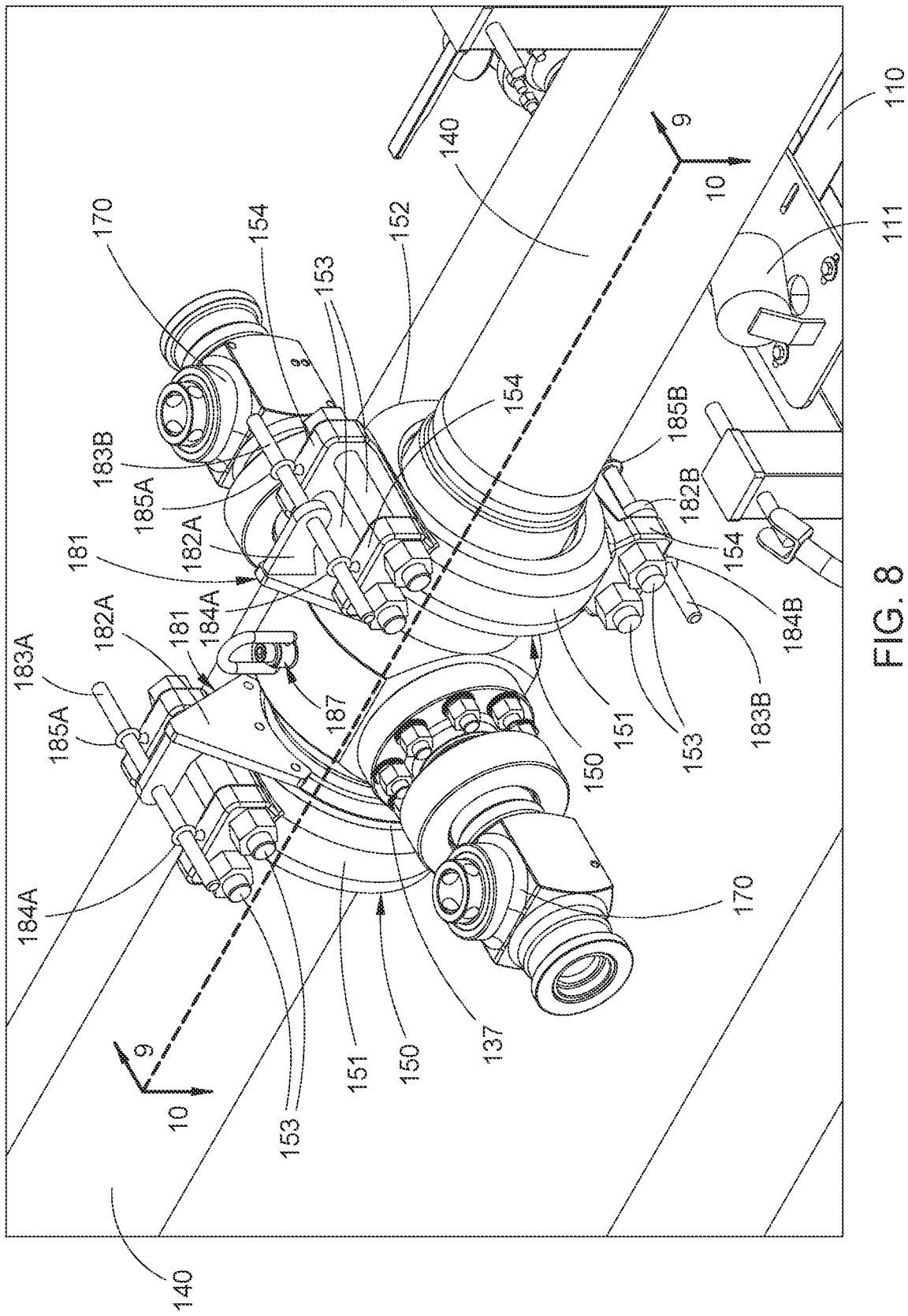
FIG. 8 is an enlarged view of the pump manifold system shown in FIG. 1.

FIG. 8 is an enlarged view of the pump manifold system 100 shown in FIG. 1. Each connection block 120 is part of a connection assembly 180.

Each clamp 150 of the plurality of clamps 150 includes a first segment 151, a second segment 152 on an opposite side of the respective outer shoulder 123, 126, and one or more fasteners 153 extending through the first segment 151 and the second segment 152. The plurality of pump valves 170 are coupled to the first and second planar faces 129, 131 of the plurality of connection blocks 120 using the quick-detach clamps 195 and the API flanges 196. The fasteners (such as the fasteners 153) described herein can include for example bolts, pins, threaded studs, and/or screws. Other fasteners are contemplated. Each segment 151, 152 includes two clamp flanges 154 adjacent the ends of the respective segment 151, 152. Two fasteners 153 extend through one clamp flange 154 of the first segment 151, and through an aligned clamp flange 154 of the second segment 152, such that a pair of fasteners 153 is on each side of the first end hub 121 and the second end hub 124 of each of the plurality of connection blocks 120. The present disclosure contemplates that a single fastener or a plurality of fasteners can be used to couple together pairs of segments 151, 152. The segments 151, 152 can be hingedly coupled together on a first side of the connection block 120, and coupled together using one or more fasteners (such as a single bolt) on a second side of the connection block 120.

The present disclosure contemplates that a different number of segments (such as a single segment or three segments) may be used for each clamp 150. The present disclosure contemplates that a different number of fasteners (such as a single bolt or two bolts) may be used for each clamp 150.

Each quick-detach clamp 195 of the quick-detach clamps 195 may be hydraulic, electrical, pneumatic, or mechanical.

In one or more embodiments, each quick-detach clamp 195 includes a latch (such as a hydraulic latch and/or a mechanical latch) and/or ring wedge(s) that engage and disengage outer shoulders of the pump valves 170 and the API flanges 196. Each quick-detach clamp 195 can include for example one or more of the disconnection devices (such as the disconnection device 440, the disconnection device 441, the disconnection device 460, the disconnection device 1930, and/or the disconnection device 1931) and/or the lock ring assemblies (such as the lock ring assembly 416) described and shown in U.S. patent application Ser. No. 17/246,279, filed Apr. 30, 2021, and/or described and shown in U.S. patent application Ser. No. 17/246,320, filed Apr. 30, 2021, both of which are herein incorporated by reference in their entireties. In one or more embodiments, each quick-detach clamp 195 is adjustable using a single fastener (such as a single bolt).

The present disclosure contemplates that one or more of the clamps 150 shown in FIGS. 1-3 can be replaced with a quick-detach clamp 195. The present disclosure contemplates that one or more of the quick-detach clamps 195 shown in FIGS. 1-3 can be replaced with a clamp 150. A quick-detach clamp 195 or a clamp 150 can be used for any connection of the pump manifold system 100.

Each of the first segment 151 and the second segment 152 includes a ring segment. In one or more embodiments, the ring segment of each of the first and second segments 151, 152 is approximately half of a ring extending between two clamp flanges 154.

The pump manifold system 100 includes a plurality of mount assemblies 181 mounting the plurality of clamps 150 to the plurality of connection blocks 120. A mount assembly 181 is used for each clamp 150.

Each of the plurality of mount assemblies 181 includes two mount flanges 182A, 182B coupled (e.g., fastened) to one of the mount shoulders 137, 138 of one of the plurality of connection blocks 120. The present disclosure contemplates that the mount shoulders 137, 138 can be omitted, and the mount flanges 182A, 182B can be coupled to other portions of the connection blocks 120 (such as coupled to outer surfaces of the first and second tubes 122, 125. Each mount assembly 181 includes one or more bars 183A, 183B (e.g., rails), and each bar 183A, 183B extends through one of the mount flanges 182A, 182B. Two bars 183A, 183B are shown. Each mount assembly 181 includes one or more links 184A, 184B, 185A, 185B interfacing with a respective bar 183A, 183B. In one or more embodiments, each mount assembly 181 includes a first link 184A, 184B interfacing with a respective bar 183A, 183B on a first side of the respective mount flange 182A, 182B. In one or more embodiments, each mount assembly 181 includes a second link 185A, 185B interfacing with a respective bar 183A, 183B on a second side of the respective mount flange 182A, 182B. In one or more embodiments, each first link 184A, 184B and each second link 185A, 185B includes an eyelet.

Each first link 184A, 184B of each of the plurality of mount assemblies 181 is coupled to (e.g., threaded into) one of the clamp flanges 154 of the first segment 151 of a respective clamp 150 of the plurality of clamps 150. Each second link 185A, 185B of each of the plurality of mount assemblies 181 is coupled to (e.g., threaded into) one of the clamp flanges 154 of the second segment 152 of the respective clamp 150 of the plurality of clamps 150. In one or more embodiments, each of the first links 184A, 1846 and the second links 185A, 185B includes an eyelet through which a bar 183A, 183B is extended. In one or more embodiments, each bar 183A, 183B has a length that is equal to or longer than a length of the fasteners 153.

Figure 9:
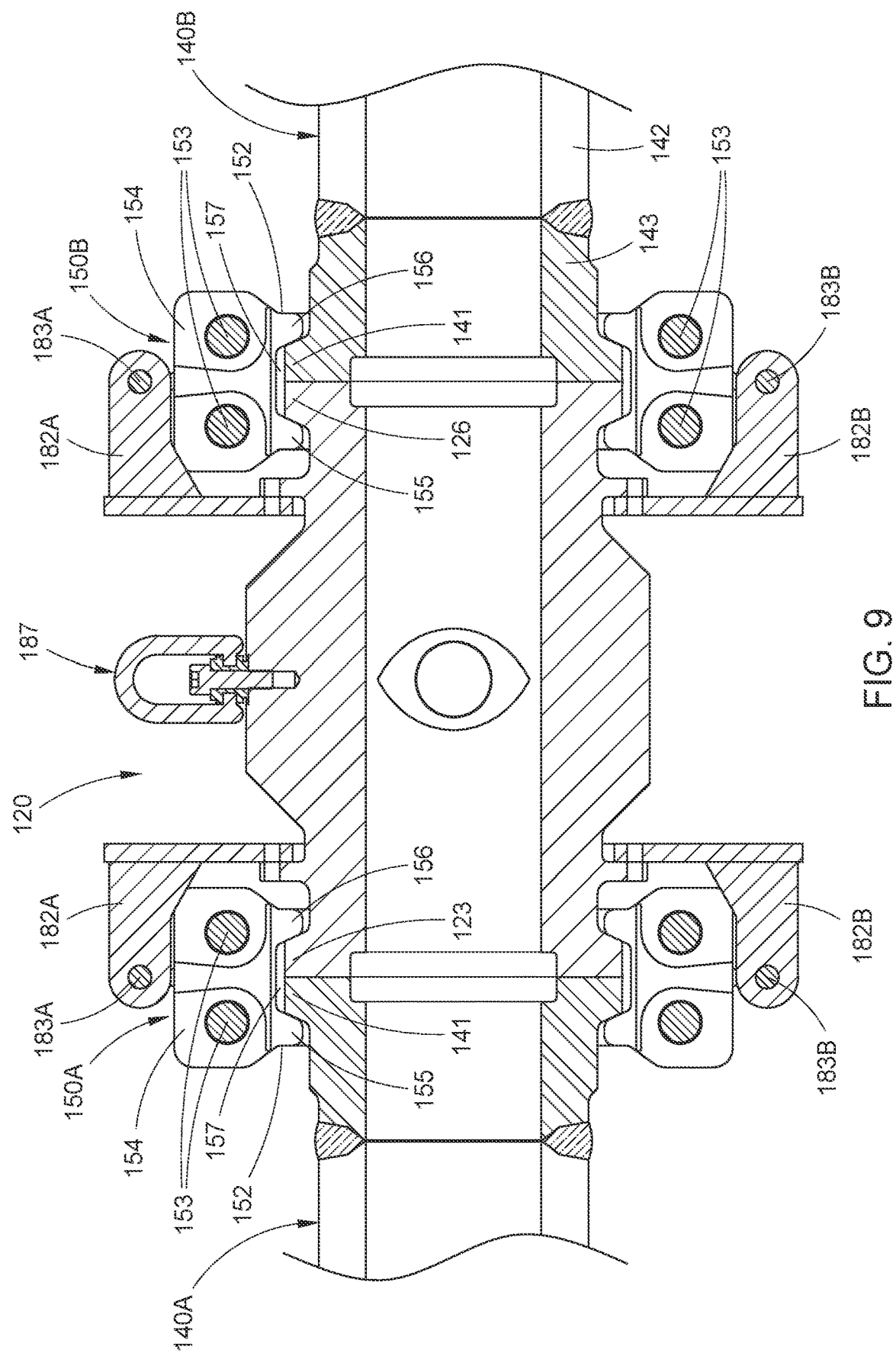
FIG. 9 is a schematic side cross-sectional view, along Section 9-9, of the connection assembly having the connection block shown in FIG. 8.

FIG. 9 is a schematic side cross-sectional view, along Section 9-9, of the connection assembly 180 having the connection block 120 shown in FIG. 8.

Each of the first segment 151 and the second segment 152 of each of the plurality of clamps 150 includes a first inner shoulder 155, a second inner shoulder 156, and a gap 157 between the first inner shoulder 155 and the second inner shoulder 156.

The first outer shoulder 123 of the connection block 120 and an outer shoulder 141 of a conduit 140 are clamped in the gap 157 between the first inner shoulder 155 and the second inner shoulder 156 of the first and second segments 151, 152 of a first clamp 150A. The second outer shoulder 126 of the connection block 120 and an outer shoulder 141 of a second conduit 140B are clamped in the gap 157 between the first inner shoulder 155 and the second inner shoulder 156 of the first and second segments 151, 152 of a second clamp 150B. The first outer shoulder 123 of the connection block 120 is received in the gaps 157 of the first and second segments 151, 152 of the first clamp 150A, and the second outer shoulder 126 of the connection block 120 is received in the gaps 157 of the first and second segments 151, 152 of the second clamp 150B. The connection block 120 includes a first mount shoulder 137 and a second mount shoulder 138.

For each connection block 120, the connection assembly 180 includes a first clamp 150A and a second clamp 150B clamped to the respective connection block 120 to clamp two conduits 140A, 140B to the respective connection block 120.

In the implementation shown in FIG. 9, the conduits 140A, 140B each include a tube section 142 coupled (e.g., welded) to a flange section 143.

Figure 10:
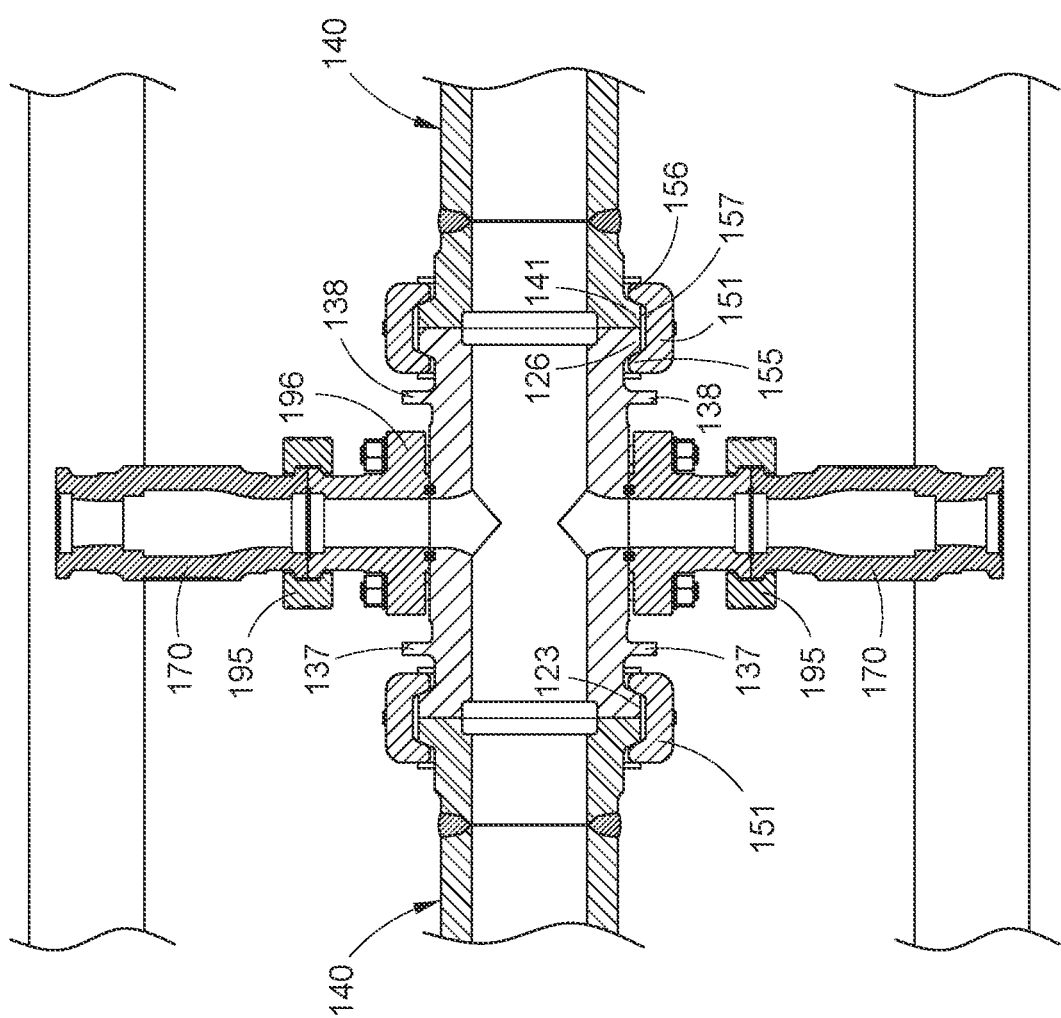
FIG. 10 is a schematic side cross-sectional view, along Section 10-10, of the connection assembly having the connection block shown in FIG. 8.

FIG. 10 is a schematic side cross-sectional view, along Section 10-10, of the connection assembly 180 having the connection block 120 shown in FIG. 8.

Figure 11:
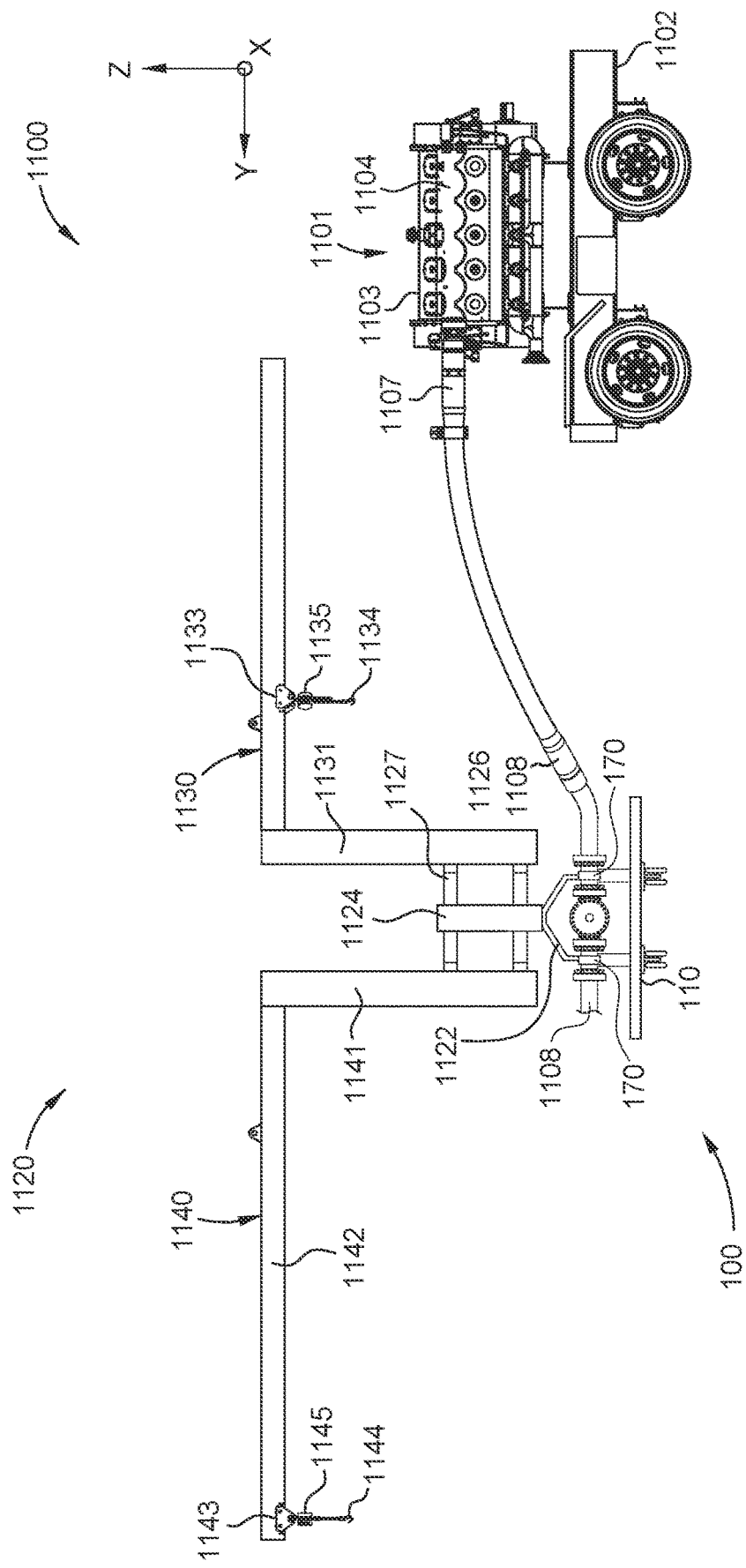
FIG. 11 is a schematic partial side view of the pump manifold system shown in FIGS. 1-3, according to one or more embodiments.

FIG. 11 is a schematic partial side view of the pump manifold system 100 shown in FIGS. 1-3, according to one or more embodiments. The pump manifold system 100 is part of a fluid injection system 1100.

The fluid injection system 1100 includes a plurality of pumps 1101 (such as frac pumps) mounted to a plurality of trailers 1102 (one pump 1101 and one trailer 1102 are shown in FIG. 11). Each of the pumps 1101 includes a power end 1103 and a fluid end 1104. The fluid injection system 1100 also includes the pump manifold system 100 disposed adjacent the pumps 1101 and fluidly coupled to the pumps 1101 to supply fluids, such as frac fluids to wellheads. For each of the pumps 1101, the fluid injection system 1100 includes a flexible hose 1106 coupled between the respective pump 1101 and the pump manifold system 100. Each flexible hose 1106 includes a first end 1107 coupled to a respective fluid end 1104 and a second end 1108 coupled to one of the connection blocks 120 through one of the pump valves 170. The present disclosure contemplates that the pump valves 170 can be omitted, and the second ends 1108 can be coupled directly to the connection block 120 and/or API flanges 196 coupled to the connection block 120. In one or more embodiments, the second ends 1108 are oriented at an angle A1. The angle A1 can be relative to, for example, the conduits 140. The second ends can be coupled to angled joints 1109 (e.g., elbows) that are coupled to the pump valves 170. In one or more embodiments, the angle A1 is within a range of 40 degrees to 50 degrees, such as about 45 degrees. In one or more embodiments, the angle A1 is within a range of 30 degrees to 60 degrees, such as about 60 degrees. The angled joints 1109 can be formed at the angle A1. In one or more embodiments, the first ends 1107 are oriented horizontally, such as in a plane parallel to the conduits 140.

The pump manifold system 100 includes a crane system 1120 positioned above at least one conduit of the plurality of conduits 140. The crane system 1120 includes a mount frame 1122 extending above the at least one conduit of the plurality of conduits 140, and a base 1124 (e.g., a column) coupled to the mount frame 1122. In one or more embodiments, the mount frame 1122 is coupled to the base frame (e.g., at least one of the one or more skids 110). In one or more embodiments, the mount frame 1122 is coupled to the connection block 120. In one or more embodiments, the base 1124 is rotatable relative to the mount frame 1122, such as by using a slew bearing coupled between the base 1124 and the mount frame 1122. In one or more embodiments (and as shown in FIG. 11), the base 1124 is rotatably fixed relative to the mount frame 1122. The crane system 1120 includes one or more bearings 1126, 1127 (two are shown in FIG. 11) coupled to the base 1124. The crane system 1120 includes a first crane 1130 coupled to the one or more bearings 1126, 1127 and extending relative to a first side of the at least one conduit 140, and a second crane 1140 coupled to the one or more bearings 1126, 1127 and extending relative to a second side of the at least one conduit 140. The second side opposes the first side. Using the one or more bearings 1126, 1127, the first crane 1130 and the second crane 1140 are pivotable relative to the mount frame 1122. In one or more embodiments, each bearing 1126, 1127 includes a single bearing coupled between the first bars 1131, 1141 on an outward side of the bearing and the base 1124 on an inward side of the bearing.

The second crane 1140 counterbalances the weight of the first crane 1130, reducing or eliminating tilting of the crane system 1120 while facilitating a smaller footprints (such as lower heights), lighter weights, and/or cost-effectiveness for the crane system 1120. The crane system 1120 is also modular in use across a variety of fluid injection systems.

Each of the first crane 1130 and the second crane 1140 includes, respectively, a first bar 1131, 1141 coupled to the base 1124, and a second bar 1132, 1142 oriented at an angle relative to the first bar 1131, 1141. Each of the first crane 1130 and the second crane 1140 includes, respectively, a trolley 1133, 1143 mounted to and movable along the second bar 1132, 1142, and a lift line 1134, 1144 coupled to the trolley 1133, 1143. The lift lines 1134, 1144 can include a hook coupled thereto. The present disclosure contemplates that the trolleys 1133, 1143 can be laterally fixed relative to the second bars 1132, 1142. In one or more embodiments, the lift lines 1134, 1144 are manually actuated or power actuated hoist lines that can lengthen and shorten the lift lines 1134, 1144 relative to the second bars 1132, 1142. In one or more embodiments, the lift lines 1134, 1144 are fixed in length relative to the second bars 1132, 1142. In one or more embodiments, the lift lines 1134, 1144 are zero-gravity hoist lines. In one or more embodiments, the lift lines 1134, 1144 each include a pulley and/or a motor disposed therealong.

In one or more embodiments, each bar 1131, 1141, 1132, 1142 includes one or more beams (such as an I-beam or a J-beam). The present disclosure contemplates that other structures (such as plates and/or tubes) can be used for each bar 1131, 1141, 1132, 1142. In one or more embodiments, each trolley 1133, 1143 includes one or more rollers configured to roll along one or more rails of the respective bar (e.g., beam). In one or more embodiments, a biasing element 1135, 1145 is disposed along each lift line 1134, 1144. In one or more embodiments, the biasing elements 1135, 1145 include a shock absorber, a non-metallic compression sleeve, a flexible joint, and/or a spring (such as a zero-gravity spring). The present disclosure contemplates that more than two bars (such as three bars, four bars, five bars, or six or more bars) can be used for each crane 1130, 1140.

The present disclosure contemplates that although two cranes 1130, 1140 are shown in FIG. 11, the crane system 1120 can include additional cranes (such as four total cranes). For example, the mount frame 1122 can be mounted to a first skid, and a second mount frame 1122 that mounts two additional cranes 1130, 1140 can be mounted to a second skid. The present disclosure contemplates that although two cranes 1130, 1140 are shown as coupled to the base 1124 in FIG. 11, the crane system 1120 can include additional cranes (such as up to six or more total cranes) coupled to the base 1124. In one or more embodiments, the base frame (e.g., one of the skids 110) is integrally formed with or welded to the mount frame 1122 such that the crane system 1120 at least partially supports the connection blocks 120 and the conduits 140.

Figure 12:
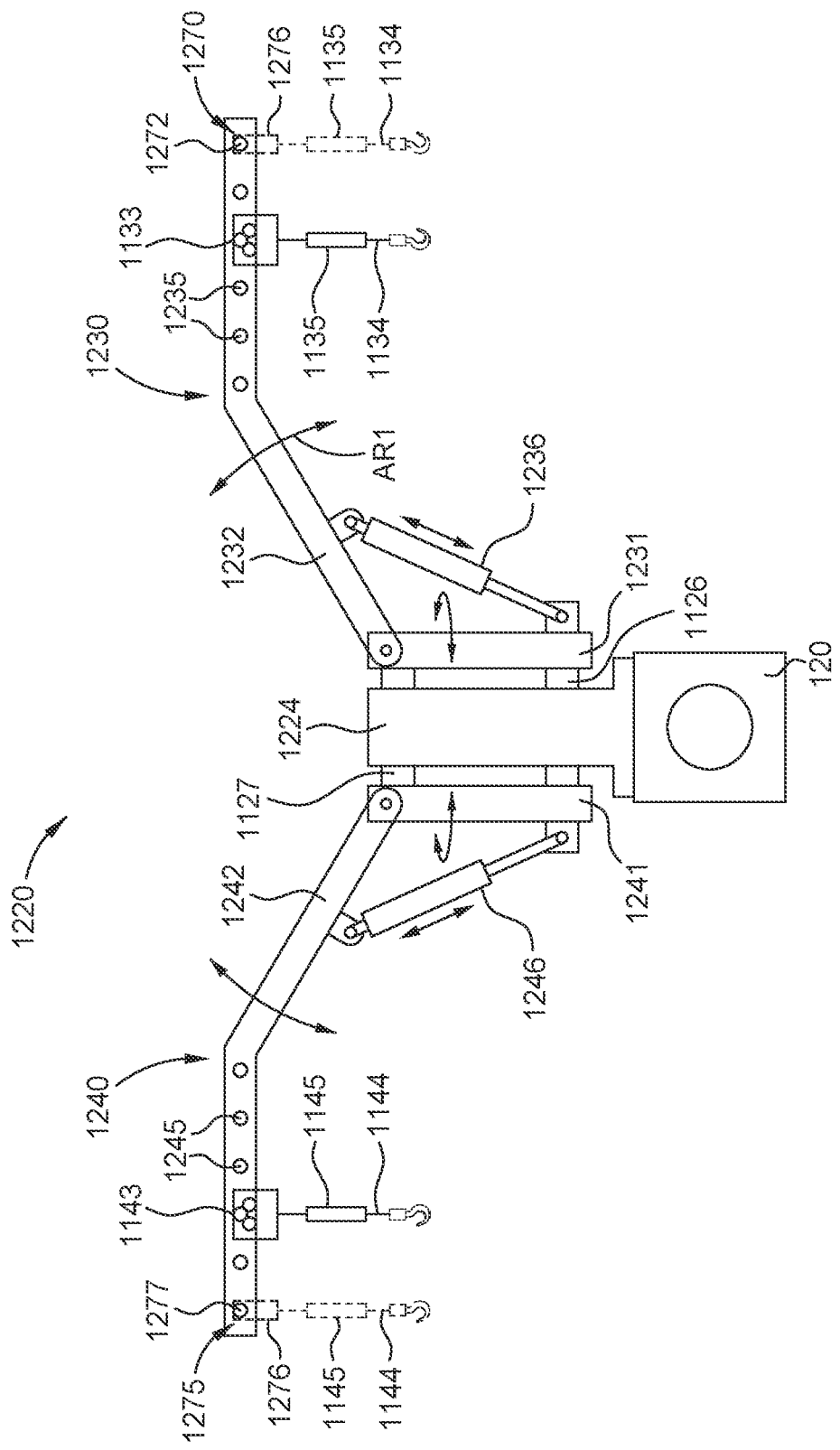
FIG. 12 is a schematic partial side view of a crane system, according to one or more embodiments.

FIG. 12 is a schematic partial side view of a crane system 1220, according to one or more embodiments. The crane system 1220 can be used in partially or completely in place of the crane system 1120 shown in FIG. 11.

The crane system 1220 includes a base 1224 coupled to the connection block 120. The crane system 1120 includes a first crane 1230 and a second crane 1240. Each of the first crane 1230 and the second crane 1240 includes, respectively, a first bar 1231, 1241 coupled to the base 1224, and a second bar 1232, 1242 oriented at an angle relative to the first bar 1231, 1241. In one or more embodiments, the trolleys 1133, 1143 are removably locked in place at a longitudinal position along the second bars 1232, 1242 (such as by using one or more pins inserted through the trolleys 1133, 1143 and through openings 1235, 1245 formed in the respective second beams 1232, 1242). The trolleys 1133, 1143 can be locked, for example, during storage and/or when conditions (such as winds) may otherwise move the trolleys 1133, 1143. The trolleys 1133, 1143 can be unlocked, laterally moved along the second bars 1232, 1242, and re-locked in place at a second longitudinal position. The present disclosure contemplates that a support frame 1270, 1275 can be used in place of, or in addition to, each of the trolley 1133 and/or the trolley 1143. The support frame 1270, 1275 is mounted to the respective second bar 1232, 1242. The respective lift line 1134, 1144 is coupled to the support frame 1270, 1275. In one or more embodiments, the support frame 1270, 1275 includes one or more shackles 1271, 1276 and one or more pins 1272, 1277 inserted through the one or more shackles 1271, 1276 and through one or more openings 1245 formed in the second bar 1232, 1242, and the lift line 1134, 1144 is suspended from the one or more shackles 1271, 1276. In one or more embodiments, each support frame 1270, 1275 includes a single shackle 1271, 1276 and a single pin 1272, 1277 inserted through a single opening 1245.

Each crane 1230, 1240 includes one or more actuators 1236, 1246 configured to pivot the respective second bar 1232, 1242 upwardly and downwardly by extending and retracting. The one or more actuators 1236, 1246 are coupled between the second bar 1232, 1242 and the first bar 1231, 1241 of the respective first or second crane 1230, 1240. In one or more embodiments, each actuator 1236, 1246 includes a cylinder and piston (such as hydraulically driven or pneumatically driven). In one or more embodiments, each actuator 1236, 1246 includes one or more of a jack (such as a bottle jack), a non-metallic compression sleeve, a flexible joint, a spring, and/or a shock absorber. Other actuators are contemplated. In one or more embodiments, one or more of the biasing elements discussed herein can be used in place of the one or more of the one or more actuators discussed herein. The second bars 1232, 1242 are each pivotable within an angular range AR1 (e.g., in the Y-Z plane).

Figure 13:
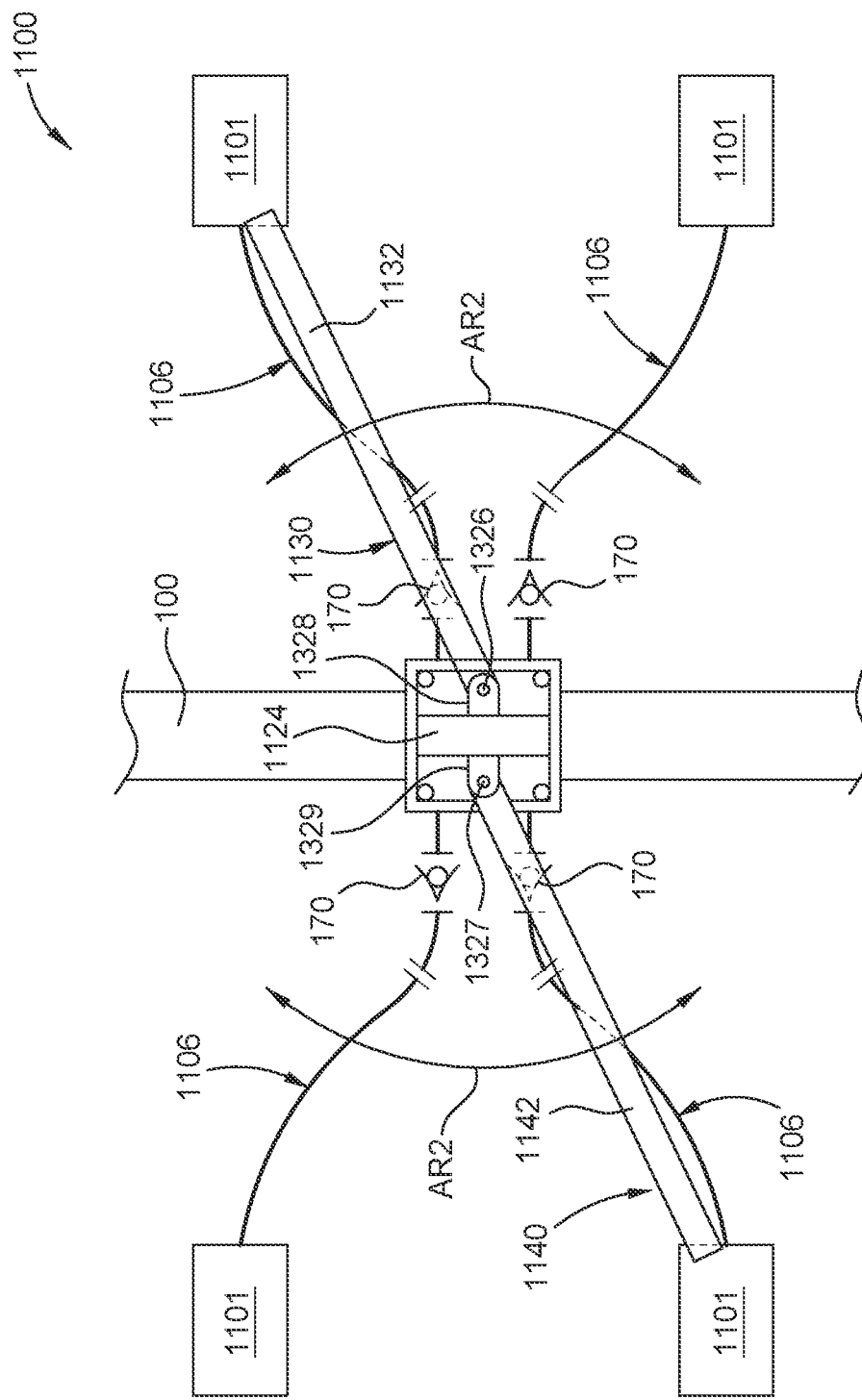
FIG. 13 is a schematic top view of the fluid injection system shown in FIG. 11, according to one or more embodiments.

FIG. 13 is a schematic top view of the fluid injection system 1100 shown in FIG. 11, according to one or more embodiments.

In one or more embodiments, each crane 1130, 1140 is a jib crane. In one or more embodiments, each crane 1130, 1140 is pivotable within an angular range AR2 (e.g., in the X-Y plane). The angular range AR2 can be 0 degrees to 180 degrees. The present disclosure contemplates that the cranes 1130, 1140 (such as in the implementation shown in FIG. 11) can have a larger angular range AR2, such as up to 360 degrees or higher. The present disclosure contemplates that one of the cranes 1130, 1140 can be used across various angular ranges AR2.

In the implementation shown in FIG. 13, the one or more bearings 1126, 1127 are replaced with flanges 1328, 1329. The cranes 1130, 1140 are coupled to the flanges 1328, 1329, respectively, using one or more bearings 1326, 1327. In such an embodiment, the first crane 1130 can be pivoted along the angular range AR2 independently of the pivoting of the second crane 1140 along the angular range AR2.

Figure 14:
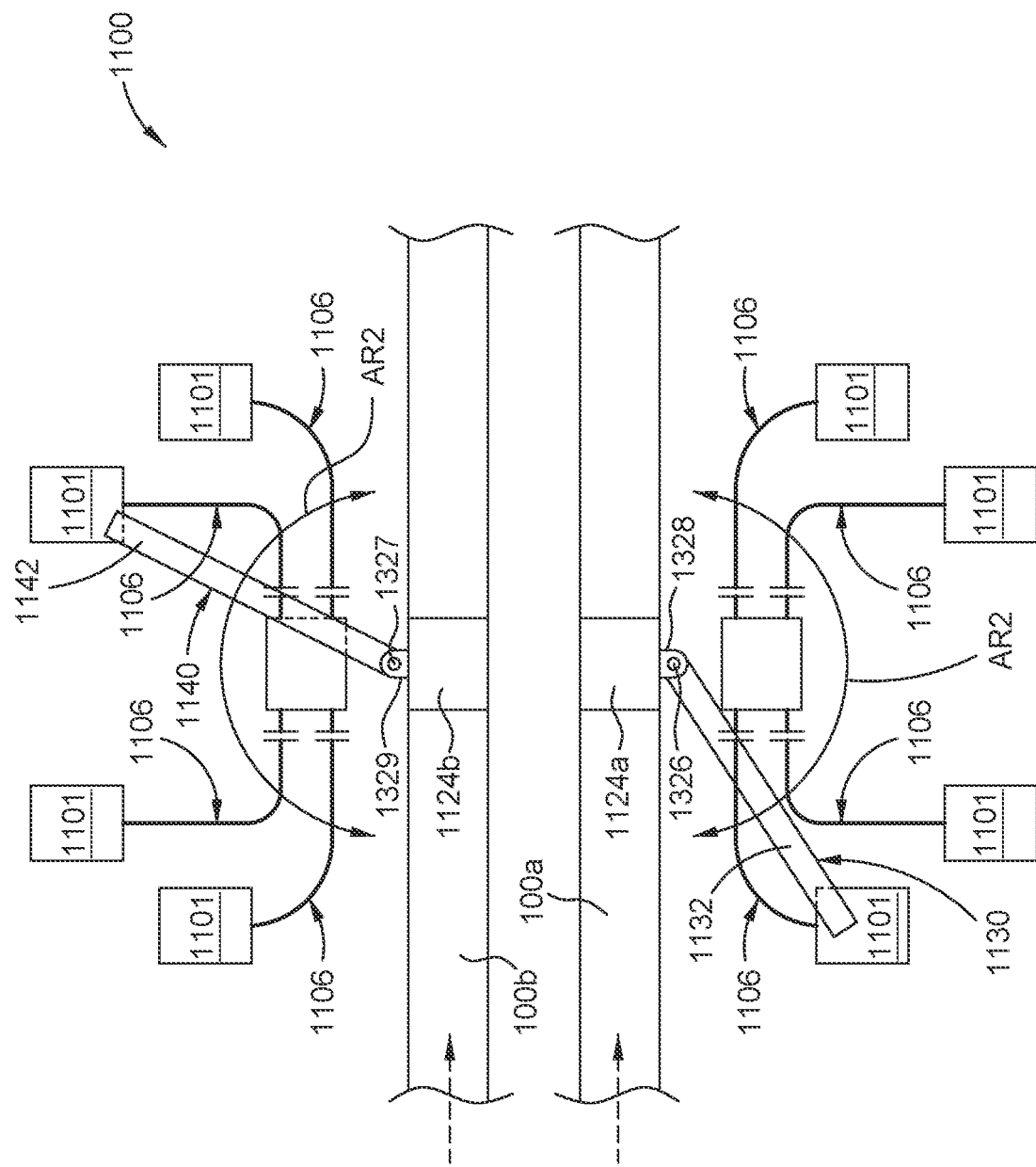
FIG. 14 is a schematic top view of the fluid injection system shown in FIG. 13, according to one or more embodiments.

FIG. 14 is a schematic top view of the fluid injection system 1100 shown in FIG. 13, according to one or more embodiments.

In the implementation shown in FIG. 14, two bases 1124a, 1124b are respectively mounted to two pump manifold systems 100a, 100b. The first crane 1130 is coupled to one base 1124a and the second crane 1140 is coupled to the other base 1124b.

Figure 15:
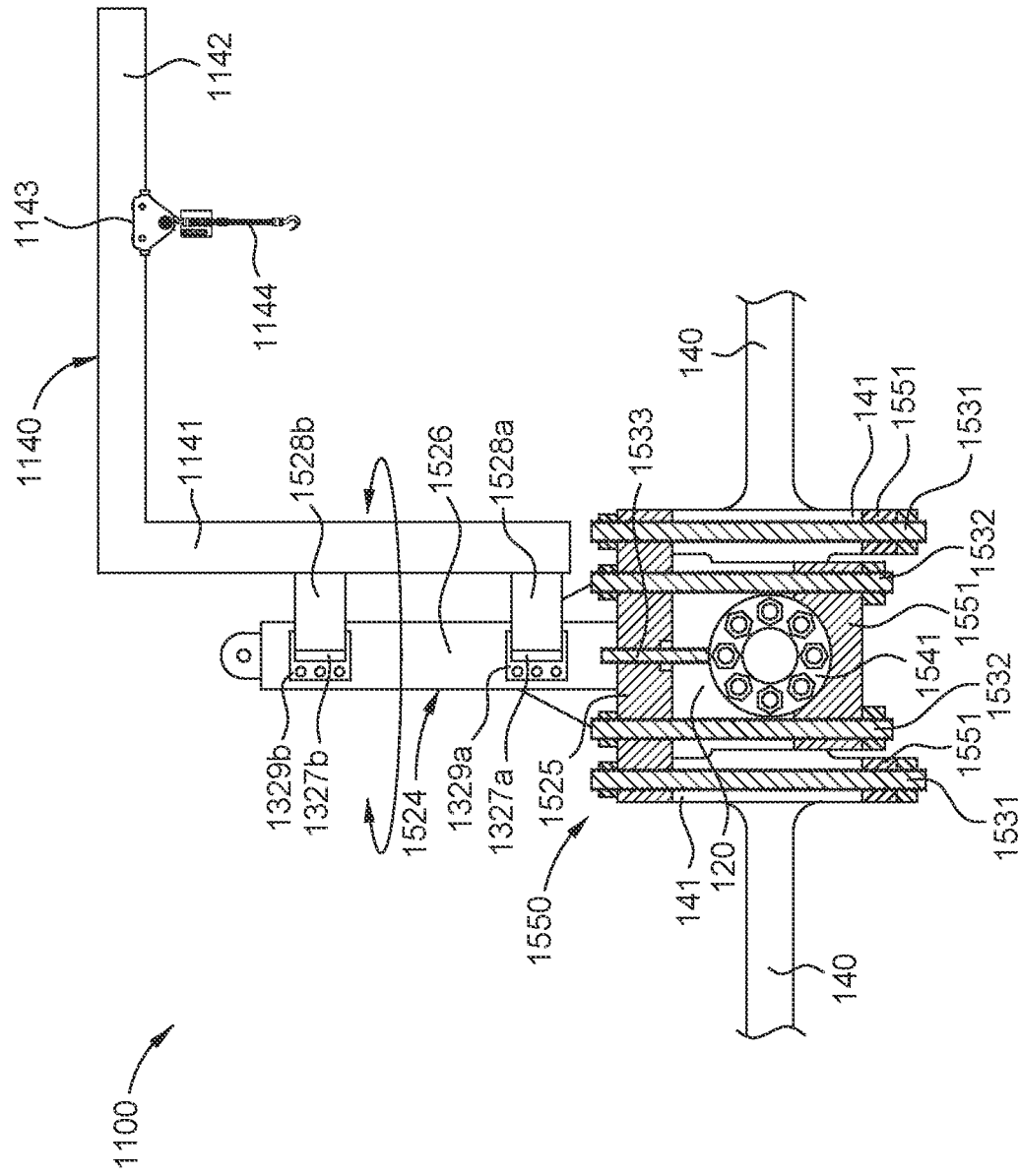
FIG. 15 is a schematic side view of the fluid injection system shown in FIG. 13, according to one or more embodiments.

FIG. 15 is a schematic side view of the fluid injection system 1100 shown in FIG. 13, according to one or more embodiments.

A crane (such as the second crane 1140 (shown in FIG. 11)) is mounted to a base 1524. The base 1524 includes a base section 1525 and a column section 1526. The base section 1525 can include one or more of plate(s), bar(s), tube(s), and/or beam(s). Other structures are contemplated for the base section 1525. One or more flanges 1329a, 1329b (two are shown) are coupled to the column section 1526 of the base 1524, and the second crane 1140 is coupled to the one or more flanges 1329a, 1329b using two bearings 1327a, 1327b and one or more pivot arms 1528a, 1528b (two are shown). The one or more pivot arms 1528a, 1528b are coupled between the second crane 1140 (on a first side of the one or more pivot arms 1528a, 1528b) and the one or more flanges 1329a, 1329b using two bearings 1327a, 1327b (on a second side of the one or more pivot arms 1528a, 1528b).

A clamp assembly 1550 includes a plurality of lower clamp segments 1551 on the other side of the connection block 120 are clamped to the base section 1525 using first fasteners 1531, 1532 (such as bolts or threaded studs coupled to nuts). The lower clamp segments 1551 can be similar to, for example, the clamp segments 151 and/or the clamp segments 152. In one or more embodiments, the first fasteners 1531, 1532 are disposed outwardly of the connection block 120. The first and second fasteners 1531, 1532 are used to clamp the base 1524 to the connection block 120. The first fasteners 1531, 1532 clamp the connection block 120 and the flanges between the base section 1525 and the plurality of clamp segments 1551.

The present disclosure contemplates that one or more of the connection blocks 120 discussed herein can be replaced with a connection block that is an API cross block.

One or more second fasteners 1533 are extended through the base section 1525 and abut against a flange 1541 (such as the API flange 196, an end flange of the conduit 140, and/or an end flange of the flexible hose 1106). In one or more embodiments, each second fastener 1533 includes a threaded stud that extends through the base section 1525 and abuts against the flange 1541. Turning the one or more second fasteners 1533 to abut against the flange(s) 1541 applies upward force to the base section 1525 and against the first fasteners 1531, 1532. Use of the one or more second fasteners 1533 facilitates clamping down the base section 15254 while reducing or eliminating the need for clamp segments on top sides of the flanges 1541. In one or more embodiments, nuts of the first fasteners 1531, 1532 on top and bottom are tightened, and then the one or more second fasteners 1533 are tightened downwardly. In one or more embodiments, the base section 1525 abuts against one or more of the connection block 120 and/or the flanges 1541.

The present disclosure contemplates that iron pipes can be used in place or part of or all of one or more of the flexible hoses 1106 described herein.

Figure 16:
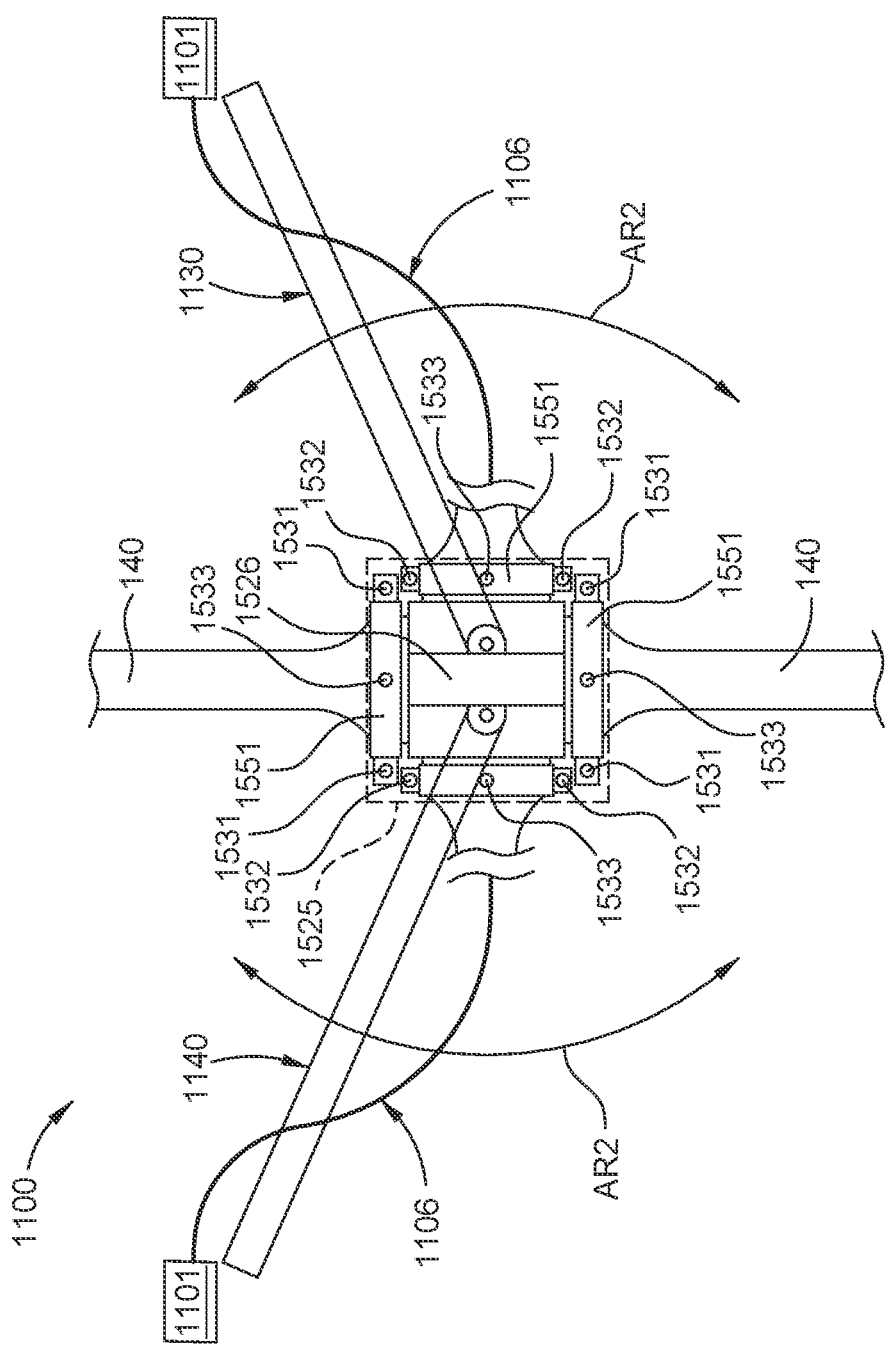
FIG. 16 is a schematic top view of the fluid injection system shown in FIG. 15, according to one or more embodiments.

FIG. 16 is a schematic top view of the fluid injection system 1100 shown in FIG. 15, according to one or more embodiments. The base section 1525 is shown in ghost in FIG. 16 for visual clarity purposes.

Figure 21:
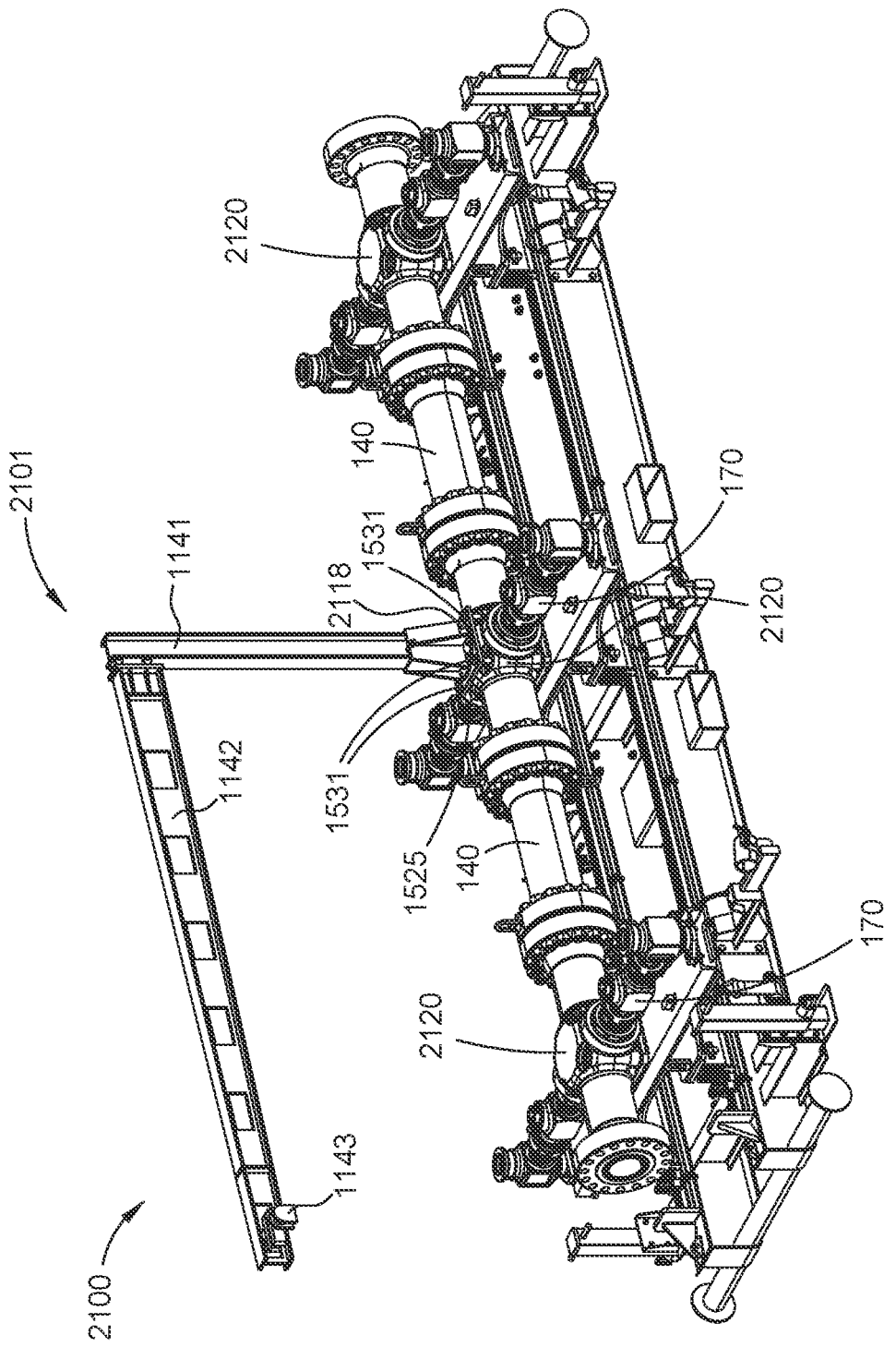
FIG. 21 is a schematic perspective view of a fluid injection system, according to one or more embodiments.

The present disclosure contemplates that fasteners (such as the fasteners 1531 and/or the fasteners 1532) can be moved inwardly such that the fasteners extend through the base section 1525 and into the connection block 120 (e.g, through a top side of the connection block 120), as shown for a single crane 2101 mounted to a connection block 2120 in FIG. 21. In such an embodiment, a single crane (such as the crane 2101 or the second crane 1140) can be mounted to the connection block 120 (or the connection block 2120), and the single crane can pivot in an angular range AR2 of up to 360 degrees or higher. In such an embodiment, the column section 1524, the bearings 1327a, 1327b, the pivot arms 1528a, 1528b, and/or the flanges 1329a, 1329b can be omitted, and the first bar 1141 can be coupled (e.g., fastened and/or welded) to the base section 1525. In such an embodiment, a slew bearing 2118 (shown in FIG. 21) can be used in place of the base section 1525 or in addition to the base section 1525. In such an embodiment, the slew bearing 2118 can be coupled between the base section 1525 and the connection block 120, or the slew bearing 2118 can be coupled between the first bar 1141 and the base section 1525 (as shown in FIG. 21).

Figure 17:
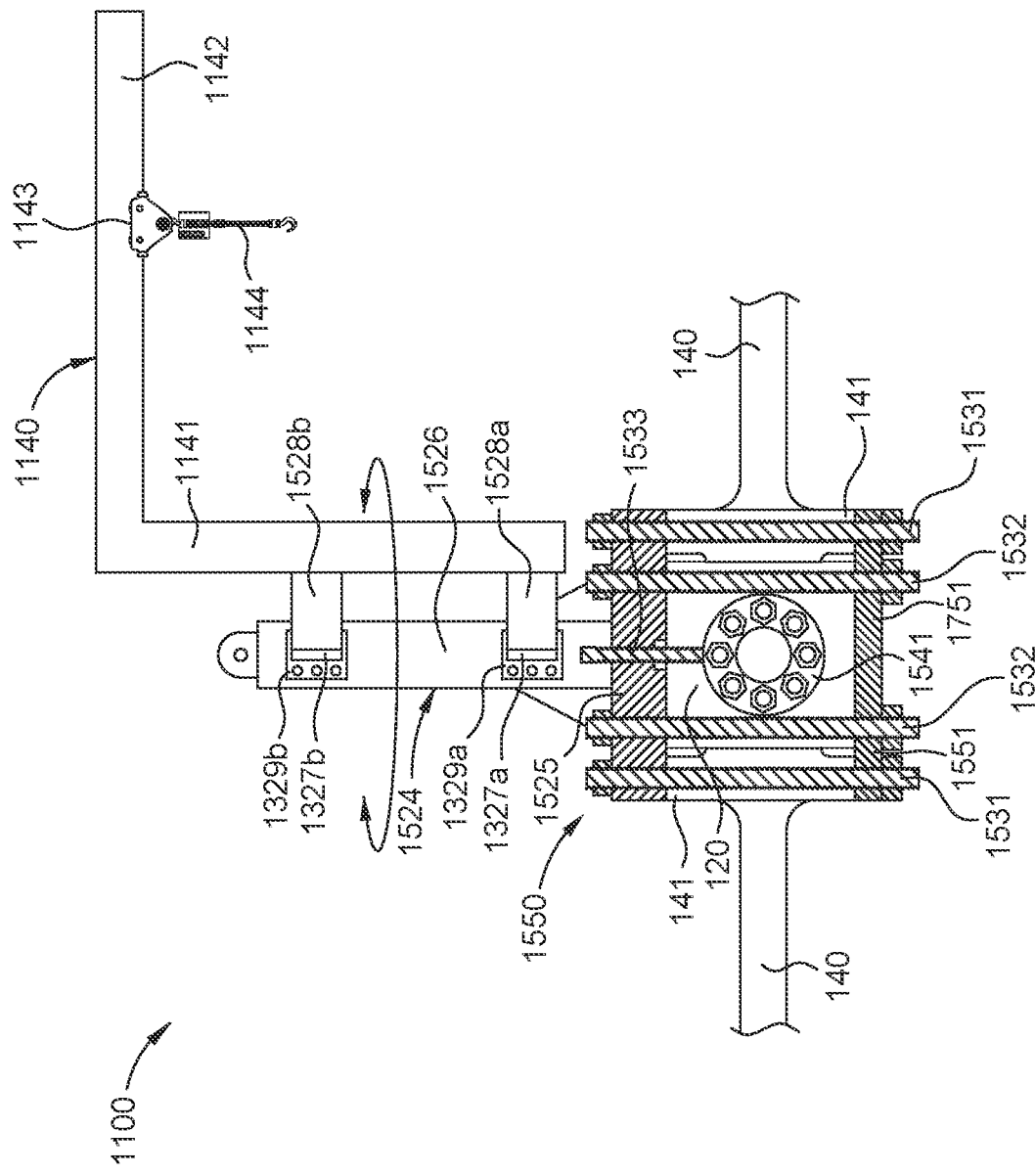
FIG. 17 is a schematic side view of a fluid injection system, according to one or more embodiments.

FIG. 17 is a schematic side view of a fluid injection system 1700, according to one or more embodiments. The fluid injection system 1700 can be similar to the fluid injection system 1100 shown in FIGS. 15 and 16, and includes one or more of the aspects, features, components, operations, and/or properties thereof.

In the fluid injection system 1700, the clamp segments 1551 are omitted, and a clamp structure 1751 is on the second side of the connection block 120. The clamp structure 1751 can include one or more of plate(s), bar(s), tube(s), and/or beam(s). Other structures are contemplated for the clamp structure 1751. The fasteners 1531, 1532 extend through the base section 1525 of the base 1524 and through the clamp structure 1751 on the second side to clamp the connection block 120 between the base section 1525 and the clamp structure 1751. The present disclosure contemplates that the base section 1525 and/or the clamp structure 1751 may or may not contact the flanges 1541 and/or the outer shoulders 141.

Figure 18:
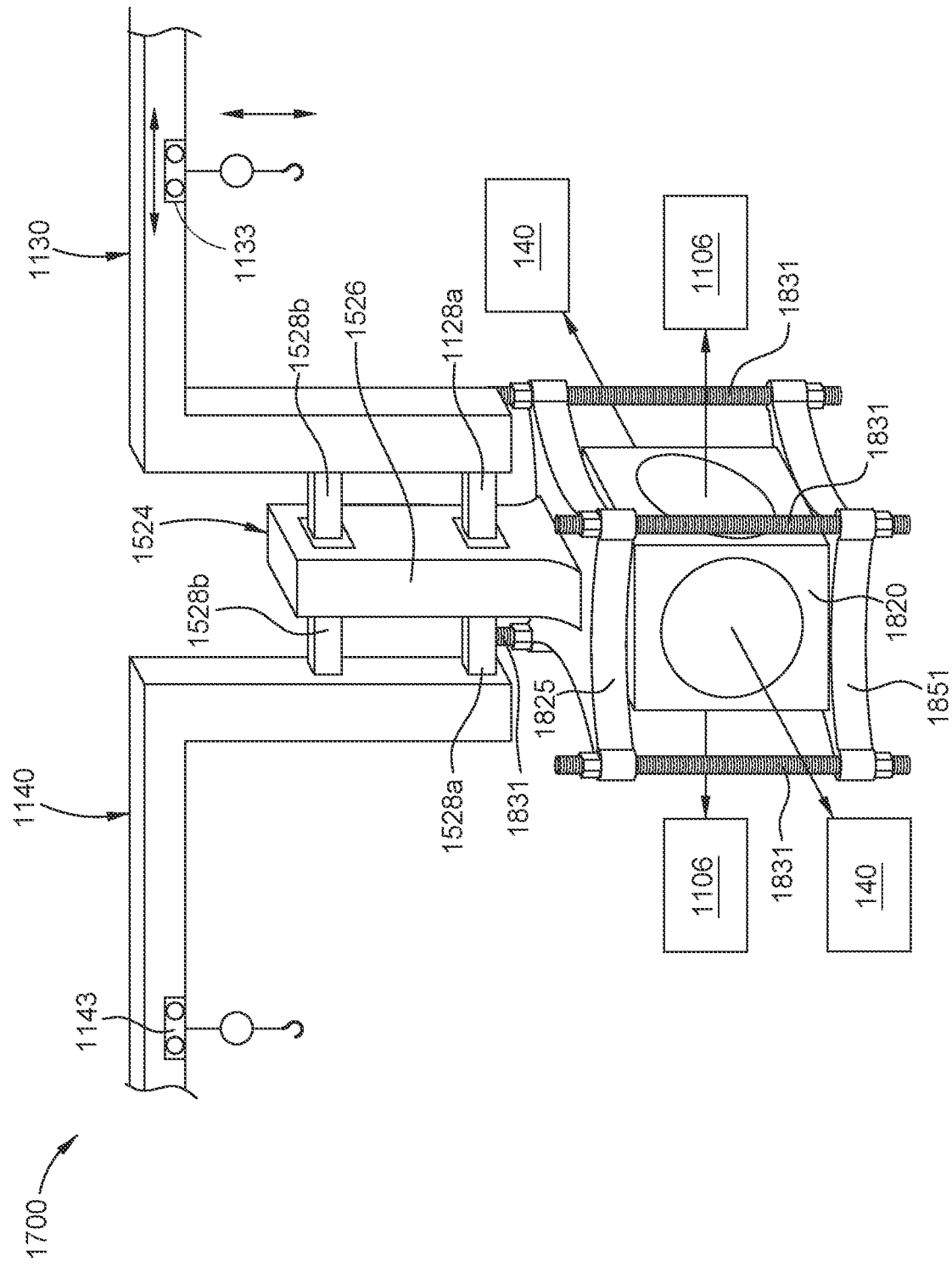
FIG. 18 is a schematic side view of the fluid injection system shown in FIG. 17, according to one or more embodiments.

FIG. 18 is a schematic side view of the fluid injection system 1700 shown in FIG. 17, according to one or more embodiments.

In the implementation shown in FIG. 18, the base 1524 includes a base section 1825 (e.g., a plate) that includes arcuate outer edges. A clamp structure 1851 (e.g., a plate) on the second side of a connection block 1820 includes arcuate outer edges. A plurality of fasteners 1831 extend through the base section 1825 and the clamp structure 1851. In one or more embodiments, the plurality of fasteners 1831 are disposed adjacent corners of the base section 1825 and/or the clamp structure 1851. In one or more embodiments, the connection block 1820 is cubic in shape. Other shapes are contemplated for the connection block 1820.

Figure 19:
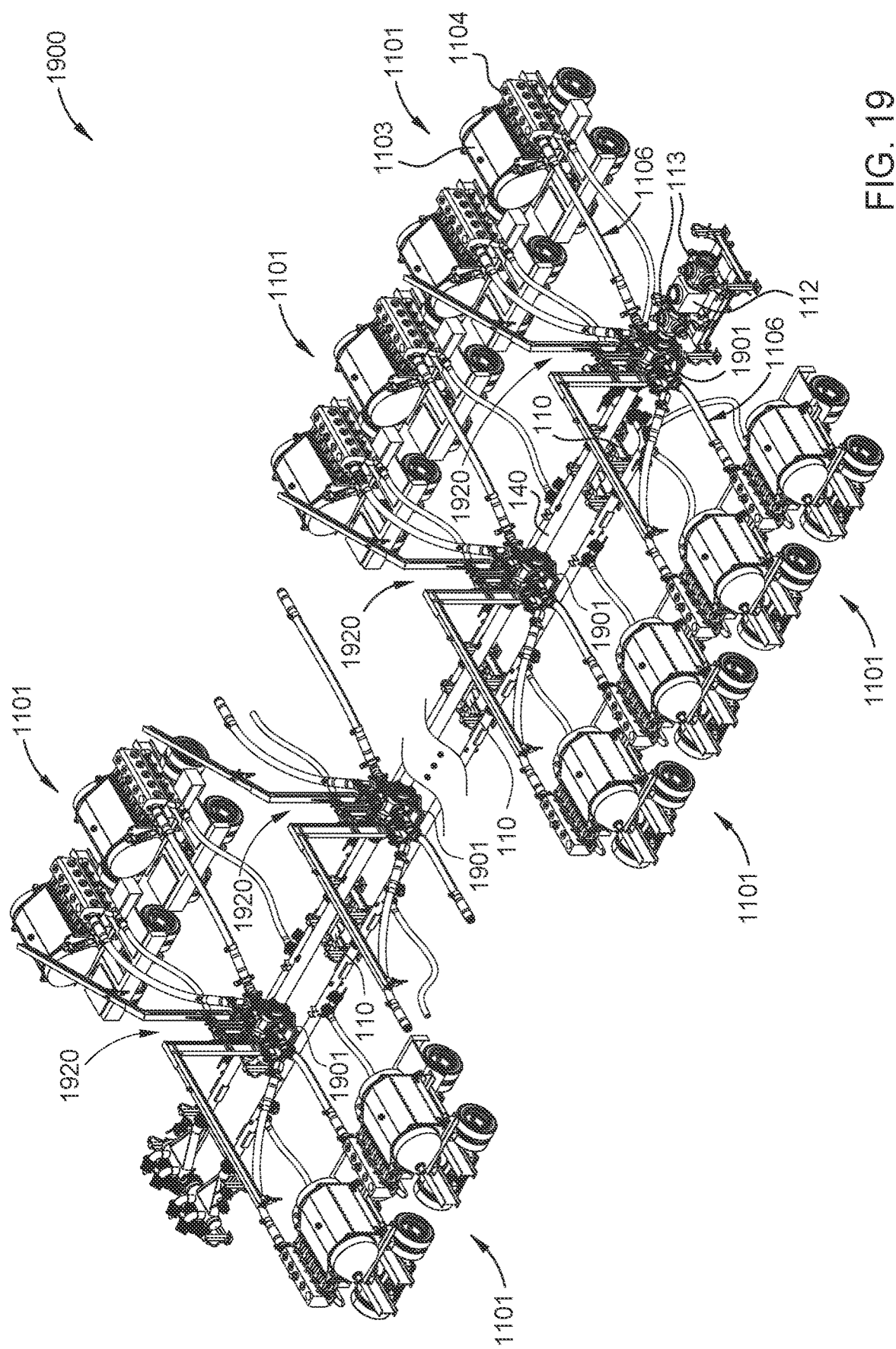
FIG. 19 is a schematic perspective view of a fluid injection system, according to one or more embodiments.

FIG. 19 is a schematic perspective view of a fluid injection system 1900, according to one or more embodiments.

The fluid injection system 1900 includes a plurality of crane systems 1920 (six, for example, can be included in FIG. 19) disposed above the connection blocks 120.

Figure 20:
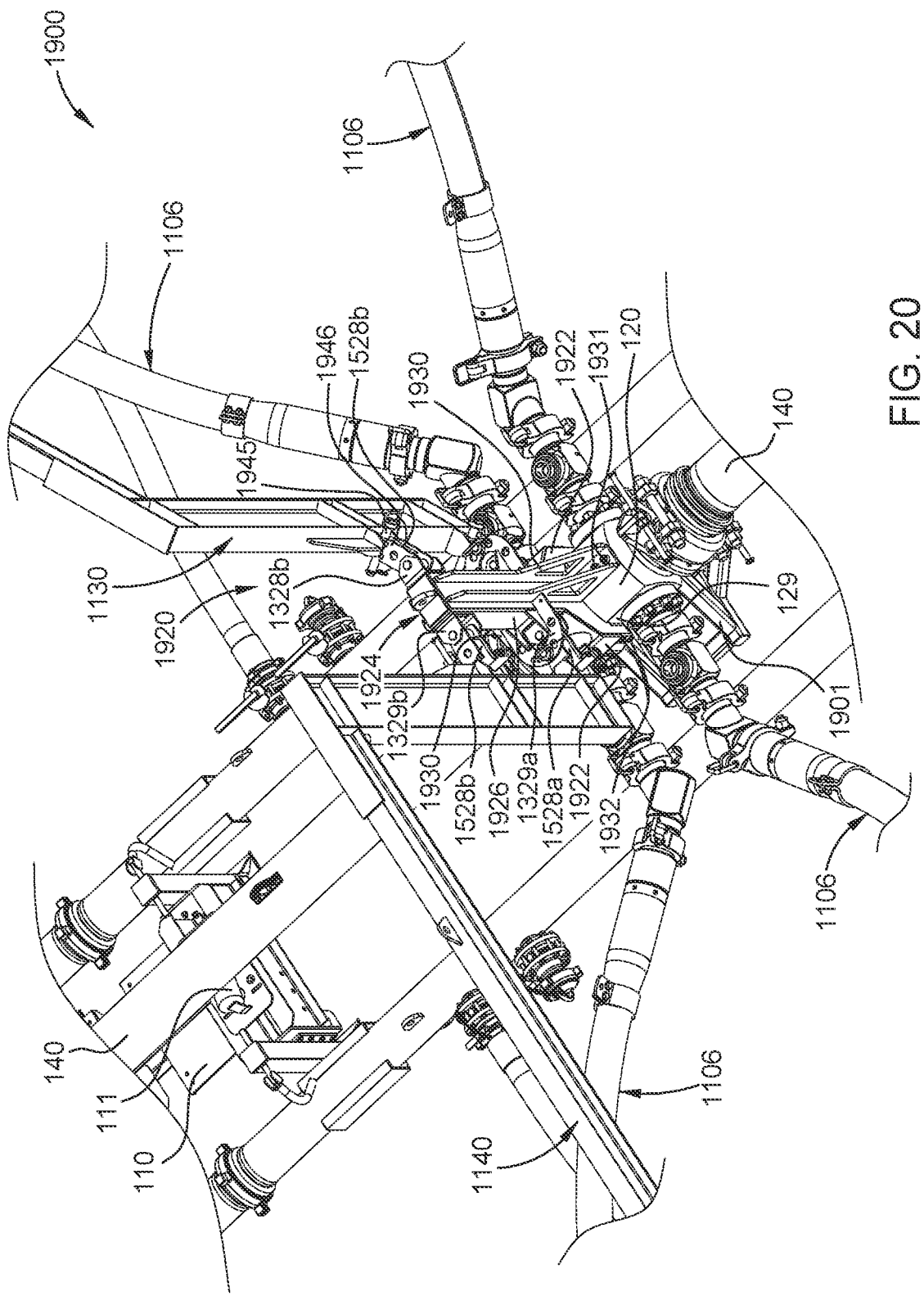
FIG. 20 is an enlarged view of one of the crane systems shown in FIG. 19, according to one or more embodiments.

FIG. 20 is an enlarged view of one of the crane systems 1920 shown in FIG. 19, according to one or more embodiments.

The first and second cranes 1130, 1140 are mounted to a base 1924. The base 1924 includes a column section 1926. A mount frame 1922 is coupled (e.g., welded to or integrally formed with) the base 1924 on opposing sides of the base 1924. The mount frame 1922 includes two legs that extend downwardly and are coupled to the planar faces 129, 131 of the connection block 120. In one or more embodiments, fasteners 1932 extending through the legs of the mount frame 1922 and into the respective planar faces 129, 131. In one or more embodiments, a floor frame 1901 of each crane system 1920 supports a respective connection block 120 and the skids 110 including the rollers 111 support the conduits 140. The base 1924 includes one or more frame sections 1930 extending relative to one or more sides of the column section 1926. The one or more frame sections 1930 abut against an upper side of the connection block 120. In one or more embodiments, one or more fasteners 1931 extend through a portion of each of the one or more frame sections 1930 and into the connection block 120. The present disclosure contemplates that the one or more fasteners 1931 can extend into a planar portion of the connection block 120. In one or more embodiments, the skids 110 and the floor frames 1901 are disposed in an alternating arrangement (as shown in FIG. 19). In the implementation shown in FIG. 20, the base 1924 includes two frame sections 1930 extending relative to opposing sides of the column section 1926, and a plurality of fasteners 1931 extend through each of the two frame sections 1930.

In one or more embodiments, one or more locking pins 1945 removably extend at least partially into (e.g., through) the one or more pivot arms 1528a, 1528b and at least partially into (e.g., through) one or more crane flanges 1946 of the first crane 1130 and/or the second crane 1140.

FIG. 21 is a schematic perspective view of a fluid injection system 2100, according to one or more embodiments.

FIG. 22 is a schematic perspective view of a connection block 2220, according to one or more embodiments.

FIG. 23 is a schematic perspective top of the connection block 2220 shown in FIG. 22, according to one or more embodiments.

The connection block 2220 is similar to the connection block 120 and includes one or more aspects, features, components, operations, and/or properties thereof. The connection block 2220 includes a first planar face 2229 and a first set of one or more hubs 2223 extending relative to the first planar face 2229, and a second planar face 2231 and a second set of one or more hubs 2226 extending relative to the second planar face 2231. Each hub 2223, 2226 includes an outer shoulder. The connection block 2220 includes a third planar face 2241 (e.g., an upper planar face), and one or more openings 2242 formed in the third planar face 2241. The connection block 2220 can include a fourth planar face (e.g., a lower planar face) and/or one or more openings formed in the fourth planar face. The connection block 2220 includes a first pair of mount shoulders 2237 adjacent the first end hub 121 and a second pair of mount shoulders 2238 adjacent the second end hub 124.

Components can abut against the third planar face 2241, and fastener(s) can be disposed in the one or more openings 2242. For example, the one or more frame sections 1930 can abut against the third planar face 2241 of the connection block 2220 and the one or more fasteners 1931 extend through a portion of each of the one or more frame sections 1930 and into the one or more openings 2242 of the connection block 2220. As another example, the base section 1525 can abut against the third planar face 2241 of the connection block 2220 and the fasteners 1531 and/or the fasteners 1532 can extend through the base section 1525 and into the one or more openings 2242 of the connection block 2220. The connection block 2220 can be used in place of and/or in addition to the connection blocks (such as the connection block 120) described herein.

The present disclosure contemplates that the crane systems described herein can include one or more outrigger structures extending relative to opposing sides of the crane systems. The one or more outrigger structures configured to interface with the ground. As an example, the base 1524 shown in FIG. 15 can include one or more outrigger structures extending relative to opposing sides of the base 1524 (such as opposing sides of the base section 1525). As another example, the 2101 shown in FIG. 1 can include one or more outrigger structures extending relative to opposing sides of the base section 1525.

Benefits of the present disclosure include transportation, installation, and maintenance of pump manifold systems in a manner that is inexpensive, simple, lightweight, easy-to-use, and having reduced footprints. As an example, using the connection blocks 120, the clamps 150, the connection assemblies, and/or the quick-detach clamps 195 facilitates quickly making up and breaking out connections with one person. As another example, the pump manifold system 100 facilitates corrosion resistance. Additionally, as an example, the pump manifold system 100 facilitates reduced equipment for pumping operations. As a further example, the crane systems herein facilitate maneuvering flexible hoses 1106 in an easy manner while facilitating reduced or eliminated chances of tilting of the crane systems. Moreover, benefits of the present disclosure include modularity in application and scalability.

It is contemplated that one or more of the aspects disclosed herein may be combined. Moreover, it is contemplated that one or more of these aspects may include some or all of the aforementioned benefits. For example, the present disclosure contemplates that one or more aspects, features, components, operations, and/or properties of the pump manifold system 100, the connection block 120, the clamps 150, the connection assemblies 180, the mount assemblies 181, the quick-detach clamps 195, the pump manifold system 300, the crane system 1120, the crane system 1220, one or more of the implementations of the fluid injection system 1100 shown in FIGS. 11-16, the fluid injection system 1700, and/or the fluid injection system 1900 may be combined.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:

1. A connection assembly, comprising:
   a connection block for disposition along a pump manifold of a pump system, the connection block comprising:
   a first end hub having a first tube and a first outer shoulder extending outwardly relative to the first tube,
   a second end hub opposing the first end hub, the second end hub having a second tube and a second outer shoulder extending outwardly relative to the second tube, and
   one or more faces between the first end hub and the second end hub;
   a first clamp and a second clamp coupled to the connection block; and
   a plurality of mount assemblies mounting the first and second clamps to the connection block, wherein at least one of the plurality of mount assemblies comprises:
   a mount flange coupled to the connection block,
   one or more bars extending through the mount flange, and
   one or more links interfacing with the one or more bars, the one or more links coupled to a respective clamp of the first and second clamps, the one or more bars extending through the one or more links, and the one or more links comprising:
   a first link on a first side of the mount flange, and
   a second link on a second side of the mount flange.

2. The connection assembly of claim 1, the connection block further comprising:
   a first planar face between the first end hub and the second end hub;
   one or more first openings formed in the first planar face;
   a second planar face between the first end hub and the second end hub; and
   one or more second openings formed in the second planar face.

3. The connection assembly of claim 2, wherein the one or more faces comprise:
   a first arcuate face between the first planar face and the second planar face; and
   a second arcuate face between the first planar face and the second planar face, the second arcuate face opposing the first arcuate face.

4. The connection assembly of claim 1, wherein each of the first outer shoulder and the second outer shoulder has an outer diameter that is less than 17.0 inches.

5. The connection assembly of claim 1, the connection block further comprising a central opening, the central opening having an inner diameter that is greater than 4.5 inches.

6. The connection assembly of claim 1, the connection block further comprising a central opening having an inner diameter, wherein each of the first outer shoulder and the second outer shoulder has an outer diameter that is a ratio of the inner diameter, wherein the ratio is 3:1 or less.

7. The connection assembly of claim 1, the connection block further comprising:
a first planar face between the first end hub and the second end hub; and
a first set of one or more hubs extending relative to the first planar face.

8. The connection assembly of claim 7, the connection block further comprising:
a second planar face between the first end hub and the second end hub; and
a second set of one or more hubs extending relative to the second planar face.

9. The connection assembly of claim 1, wherein one or more of the first clamp or the second clamp comprises three segments and a single fastener.

10. The connection assembly of claim 1, wherein each of the first clamp and the second clamp comprises:
a first segment;
a second segment; and
one or more fasteners extending through the first segment and the second segment.

11. The connection assembly of claim 10, wherein each of the first segment and the second segment of each of the first clamp and the second clamp comprises:
a first inner shoulder;
a second inner shoulder; and
a gap between the first inner shoulder and the second inner shoulder.

12. The connection assembly of claim 11, wherein the first outer shoulder of the connection block is received in the gap of the first segment of the first clamp and the gap of the second segment of the first clamp, and the second outer shoulder of the connection block is received in the gap of the first segment of the second clamp and the gap of the second segment of the second clamp.

13. The connection assembly of claim 1, wherein:
the one or more links comprise an eyelet threaded into the respective clamp, the one or more bars extending through the one or more links to support the one or more links; and
the mount flange coupled to one or more mount shoulders extending outwardly relative to the connection block.

14. A pump manifold system, comprising:
a plurality of connection blocks, at least one of the plurality of connection blocks comprising:
a first end hub,
a second end hub opposing the first end hub, and
one or more planar faces between the first end hub and the second end hub;
a plurality of conduits between the plurality of connection blocks;
a plurality of clamps coupling the plurality of conduits to the plurality of connection blocks; and
a plurality of mount assemblies mounting the plurality of clamps to the plurality of connection blocks, wherein at least one of the plurality of mount assemblies comprises:
a mount flange coupled to a connection block of the plurality of connection blocks on a first side of the connection block,
one or more bars extending through the mount flange, the one or more bars disposed on the first side of the connection block,
one or more links interfacing with the one or more bars, the one or more links disposed on the first side of the connection block, the one or more links coupled to a respective clamp of the plurality of clamps, the one or more bars extending through the one or more links, and the one or more links comprising:
a first link on a first side of the mount flange, and
a second link on a second side of the mount flange,
a second mount flange coupled to the connection block on a second side of the connection block, the second side opposing the first side,
one or more second bars extending through the second mount flange on the second side of the connection block, and
one or more second links interfacing with the one or more second bars, the one or more second links coupled to the respective clamp of the plurality of clamps on the second side of the connection block.

15. The pump manifold system of claim 14, further comprising:
one or more pump valves coupled to the one or more planar faces of the plurality of connection blocks; and
one or more angled joints coupled to the one or more pump valves, the plurality of angled joints configured to connect to one or more pumps, and the one or more angled joints formed at an angle within a range of 30 degrees to 60 degrees.

16. The pump manifold system of claim 14, further comprising:
an isolation valve.

17. The pump manifold system of claim 14, further comprising:
one or more pump valves coupled to the one or more planar faces of the plurality of connection blocks.

18. The pump manifold system of claim 14, further comprising:
one or more angled joints coupled to the one or more planar faces, the one or more angled joints configured to connect to one or more pumps, and the one or more angled joints formed at an angle within a range of 30 degrees to 60 degrees.

19. The pump manifold system of claim 14, wherein at least one clamp of the plurality of clamps comprises:
a first segment;
a second segment; and
one or more fasteners extending through the first segment and the second segment.

20. The pump manifold system of claim 19, wherein each of the first segment and the second segment of each of the plurality of clamps comprises:
a first inner shoulder;
a second inner shoulder; and
a gap between the first inner shoulder and the second inner shoulder.

21. The pump manifold system of claim 19, wherein:
each of the first segment and the second segment includes a ring segment; and
the one or more fasteners comprise a pair of fasteners on each side of the first end hub of each of the plurality of connection blocks.

22. The pump manifold system of claim 14, wherein at least one clamp of the plurality of clamps comprises a latch.

23. The pump manifold system of claim 14, wherein at least one clamp of the plurality of clamps comprises three segments and a single fastener.

24. The pump manifold system of claim 14, wherein the first end hub has a first tube and a first outer shoulder extending outwardly relative to the first tube, and the second end hub has a second tube and a second outer shoulder extending outwardly relative to the second tube.

25. The pump manifold system of claim 24, wherein the first outer shoulder of a first connection block and an outer shoulder of a first conduit are clamped in a first gap between a first inner shoulder and a second inner shoulder of a first clamp, and the second outer shoulder of the first connection block and an outer shoulder of a second conduit are clamped in a second gap between the first inner shoulder and the second inner shoulder of a second clamp.

26. The pump manifold system of claim 14, wherein at least one of the plurality of clamps is adjustable using a single fastener.

27. The pump manifold system of claim 14, further comprising:
a base frame supporting the plurality of connection blocks and the plurality of conduits; and
one or more of rollers mounted to the base frame, wherein the plurality of connection blocks and the plurality of conduits are movable along the one or more rollers.

28. The pump manifold system of claim 14, further comprising:
one or more flanges coupled to the one or more planar faces of the plurality of connection blocks, the one or more flanges configured to connect to one or more pumps.

29. The pump manifold system of claim 14, wherein the one or more second bars extend through the one or more second links, and the one or more second links comprise:
a third link on a first side of the second mount flange; and
a fourth link on a second side of the second mount flange.

30. The pump manifold system of claim 14, wherein:
the one or more links comprise an eyelet threaded into the respective clamp on the first side of the at least one of the plurality of connection blocks;
the one or more second links comprise a second eyelet threaded into the respective clamp on the second side at least one of the plurality of the connection blocks; and
the mount flange and the second mount flange are coupled to one or more mount shoulders extending outwardly relative to the at least one of the plurality of connection blocks.

31. A connection assembly, comprising:
a connection block for disposition along a pump manifold of a pump system, the connection block comprising:
a first end hub having a first tube and a first outer shoulder extending outwardly relative to the first tube;
a second end hub opposing the first end hub, the second end hub having a second tube and a second outer shoulder extending outwardly relative to the second tube;
one or more faces between the first end hub and the second end hub;
a first clamp and a second clamp coupled to the connection block; and
a plurality of mount assemblies mounting the first and second clamps to the connection block, wherein at least one of the plurality of mount assemblies comprises:
a mount flange coupled to the connection block, the mount flange coupled to one or more mount shoulders extending outwardly relative to the connection block,
one or more bars extending through the mount flange, and
one or more links interfacing with the one or more bars, the one or more links coupled to a respective clamp of the first and second clamps, the one or more links comprising an eyelet threaded into the respective clamp, and the one or more bars extending through the one or more links to support the one or more links.

32. A pump manifold system, comprising:
a plurality of connection blocks, at least one of the plurality of connection blocks comprising:
a first end hub,
a second end hub opposing the first end hub, and
one or more planar faces between the first end hub and the second end hub;
a plurality of conduits between the plurality of connection blocks;
a plurality of clamps coupling the plurality of conduits to the plurality of connection blocks; and
a plurality of mount assemblies mounting the plurality of clamps to the plurality of connection blocks, wherein at least one of the plurality of mount assemblies comprises:
a mount flange coupled to a connection block of the plurality of connection blocks on a first side of the connection block,
one or more bars extending through the mount flange, the one or more bars disposed on the first side of the connection block,
one or more links interfacing with the one or more bars, the one or more links disposed on the first side of the connection block, the one or more links coupled to a respective clamp of the plurality of clamps, and the one or more links comprising an eyelet threaded into the respective clamp on the first side of the connection block,
a second mount flange coupled to the connection block on a second side of the connection block, the second side opposing the first side, and the mount flange and the second mount flange coupled to one or more mount shoulders extending outwardly relative to the connection block,
one or more second bars extending through the second mount flange on the second side of the connection block, and
one or more second links interfacing with the one or more second bars, the one or more second links coupled to the respective clamp of the plurality of clamps on the second side of the connection block, and the one or more second links comprising a second eyelet threaded into the respective clamp on the second side of the connection block.

* * * * *